(12) United States Patent
Li et al.

(10) Patent No.: US 12,004,130 B2
(45) Date of Patent: Jun. 4, 2024

(54) WIRELESS COMMUNICATION METHOD AND COMMUNICATIONS APPARATUS

(71) Applicant: Huawei Technologies Co., Ltd., Shenzhen (CN)

(72) Inventors: Shengyu Li, Beijing (CN); Lei Guan, Beijing (CN); Ruixiang Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 17/372,197

(22) Filed: Jul. 9, 2021

(65) Prior Publication Data

US 2021/0337542 A1 Oct. 28, 2021

Related U.S. Application Data

(63) Continuation of application No. PCT/CN2020/070256, filed on Jan. 3, 2020.

(30) Foreign Application Priority Data

Jan. 11, 2019 (CN) .......................... 201910028342.7

(51) Int. Cl.
*H04W 72/0446* (2023.01)
*H04L 1/1812* (2023.01)
(52) U.S. Cl.
CPC ....... *H04W 72/0446* (2013.01); *H04L 1/1812* (2013.01)
(58) Field of Classification Search
CPC ............. H04W 72/0446; H04L 1/1812; H04L 1/1861; H04L 5/0055
See application file for complete search history.

(56) References Cited

U.S. PATENT DOCUMENTS

2018/0019843 A1   1/2018  Papasakellariou
2020/0044796 A1*  2/2020  Yang ..................... H04W 56/00
(Continued)

FOREIGN PATENT DOCUMENTS

CN   102763361 A   10/2012
CN   103929287 A    7/2014
(Continued)

OTHER PUBLICATIONS

Samsung, "Draft CR to 38.213 capturing agreements on carrier aggregation," 3GPP TSG RAN WG1 Meeting #95, Spokane, USA, R1-1814332, total 7 pages, 3rd Generation Partnership Project, Valbonne, France (Nov. 12-16, 2018).

(Continued)

*Primary Examiner* — Kan Yuen
(74) *Attorney, Agent, or Firm* — Leydig, Voit & Mayer, Ltd.

(57) ABSTRACT

This application provides a wireless communication method and a communications apparatus, to implement semi-static codebook feedback at a sub-slot granularity. The method includes: determining a candidate opportunity set, where a quantity of candidate opportunities included in the candidate opportunity set is a maximum quantity of non-overlapping data transmission opportunities included in a data transmission opportunity set, the data transmission opportunity set corresponds to a first set, the first set includes one or more downlink sub-time units, and the one or more downlink sub-time units correspond to a target uplink sub-time unit; and sending or receiving feedback information in the target uplink sub-time unit, where the feedback information includes a hybrid automatic repeat request acknowledgement HARQ-ACK codebook corresponding to the candidate opportunity set.

20 Claims, 7 Drawing Sheets

(56) References Cited

U.S. PATENT DOCUMENTS

| | | | |
|---|---|---|---|
| 2020/0106566 A1* | 4/2020 | Yeo | H04W 28/04 |
| 2020/0213046 A1* | 7/2020 | Wang | H04L 1/1861 |
| 2020/0322959 A1* | 10/2020 | Lin | H04L 1/1887 |
| 2020/0403678 A1* | 12/2020 | Shi | H04W 72/53 |
| 2022/0103310 A1* | 3/2022 | Takeda | H04L 1/1896 |
| 2022/0116156 A1* | 4/2022 | Takeda | H04L 1/1861 |

FOREIGN PATENT DOCUMENTS

| | | |
|---|---|---|
| CN | 107852318 A | 3/2018 |
| CN | 108023719 A | 5/2018 |
| CN | 108809534 A | 11/2018 |
| EP | 2955870 A1 | 12/2015 |
| WO | 2018128474 A1 | 7/2018 |

OTHER PUBLICATIONS

"3rd Generation Partnership Project; Technical Specification Group Radio Access Network; NR; Physical channels and modulation (Release 15)," 3GPP TS 38.211 V15.3.0, total 96 pages, 3rd Generation Partnership Project, Valbonne, France (Sep. 2018).

OPPO, "UCI enhancement for URLLC," 3GPP TSG RAN WG1 Meeting #95, Spokane, USA, R1-1812816, total 6 pages, 3rd Generation Partnership Project, Valbonne, France (Nov. 12-16, 2018).

Samsung, "Corrections on CA operation," 3GPP TSG RAN WG1 Meeting #92bis, Sanya, China, R1-1804381, total 5 pages, 3rd Generation Partnership Project, Valbonne, France (Apr. 16-20, 2018).

Samsung, "Corrections on CA operation," 3GPP TSG RAN WG1 Meeting #93, Busan, Korea, R1-1806740, total 5 pages, 3rd Generation Partnership Project, Valbonne, France (May 21-25, 2018).

Vivo, "DL intra UE Tx prioritization for URLLC," 3GPP TSG RAN WG1 Meeting #95, Spokane, USA, R1-1812321, total 4 pages (Nov. 12-16, 2018).

"3rd Generation Partnership Project; Technical Specification Group Radio Access Network; NR; Physical layer procedures for control (Release 15)," 3GPP TS 38.213 V15.7.0, total 108 pages, 3rd Generation Partnership Project, Valbonne, France (Sep. 2019).

"3rd Generation Partnership Project; Technical Specification Group Radio Access Network; NR; Radio Resource Control (RRC) protocol specification (Release 15)," 3GPP TS 38.331 V15.3.0, total 445 pages, 3rd Generation Partnership Project, Valbonne, France (Sep. 2018).

OPPO, "Offline summary on UCI enhancements for URLLC," 3GPP TSG RAN WG1 Meeting #95, Spokane, USA, R1-1814273, XP051494725, Total 8 pages, 3rd Generation Partnership Project, Valbonne, France (Nov. 12-16, 2018).

* cited by examiner

WIRELESS COMMUNICATION METHOD AND COMMUNICATIONS APPARATUS

CROSS-REFERENCE TO RELATED APPLICATIONS

This application is a continuation of International Application No. PCT/CN2020/070256, filed on Jan. 3, 2020, which claims priority to Chinese Patent Application No. 201910028342.7, filed on Jan. 11, 2019. The disclosures of the aforementioned applications are hereby incorporated by reference in their entireties.

TECHNICAL FIELD

This application relates to the communications field, and more specifically, to a wireless communication method and a communications apparatus.

BACKGROUND

Hybrid automatic repeat request (HARQ) is a high-efficiency transmission mechanism. Reliability of downlink data transmission can be greatly improved through retransmission. In addition, only when a terminal device feeds back a negative acknowledgement (NACK), a network device needs to perform retransmission. Therefore, overall resource consumption of data transmission is reduced.

In a wireless communications system (for example, in a new radio access technology (NR) system), acknowledgements (ACK)/NACKs in one slot need to be jointly coded and transmitted. Transmission flexibility is insufficient, and an ACK/NACK transmission latency may increase. In view of this, a plurality of HARQ-ACK codebooks may be fed back in one slot. To be specific, a plurality of time-division physical uplink control channel (PUCCH) resources in one slot separately carry different HARQ-ACK codebooks for feedback, so that a feedback latency is reduced, and feedback reliability is improved. A possible implementation method is to change HARQ-ACK codebook feedback from per slot (per slot) to per sub-slot (per sub-slot). In other words, one uplink slot is divided into a plurality of sub-slots, and an indication of a latency from downlink data transmission to corresponding ACK/NACK feedback also changes to a sub-slot granularity. In this way, ACKs/NACKs pointing to a same sub-slot are jointly coded and fed back, and ACKs/NACKs pointing to different sub-slots are separately fed back. Therefore, an existing HARQ-ACK feedback mechanism is more compatible.

However, currently, there is still no related solution about how to perform the foregoing sub-slot-based HARQ-ACK codebook feedback in semi-static codebook feedback.

SUMMARY

This application provides a wireless communication method and a communications apparatus, to implement semi-static codebook feedback at a sub-slot granularity.

According to a first aspect, a wireless communication method is provided, including: determining a candidate opportunity set, where a quantity of candidate opportunities included in the candidate opportunity set is a maximum quantity of non-overlapping data transmission opportunities included in a data transmission opportunity set, where the data transmission opportunity set corresponds to a first set, the first set includes one or more downlink sub-time units, and the one or more downlink sub-time units correspond to a target uplink sub-time unit; and sending or receiving feedback information in the target uplink sub-time unit, where the feedback information includes a hybrid automatic repeat request acknowledgement HARQ-ACK codebook corresponding to the candidate opportunity set.

Optionally, a length of the downlink sub-time unit is less than a length of one downlink slot, and a length of the uplink sub-time unit is less than a length of one uplink slot. For example, the uplink sub-time unit may be an uplink sub-slot, and the downlink sub-time unit may be a downlink sub-slot. Alternatively, the uplink sub-time unit and the downlink sub-time unit may be collectively referred to as sub-slots.

Optionally, a downlink time unit described below includes two downlink sub-time units, and/or two uplink sub-time units are included in one uplink time unit.

Optionally, the downlink time unit is a downlink slot, and/or the uplink time unit is an uplink slot.

Optionally, the one or more downlink sub-time units included in the first set may be determined based on one or more offsets. A time domain offset of the target uplink sub-time unit relative to each of the one or more downlink sub-time units is one of the one or more offsets, and the one or more downlink sub-time units respectively correspond to the one or more offsets. For example, if there are two offsets, the first set may include two downlink sub-time units, and the two downlink sub-time units each correspond to one of the two offsets.

For example, the one or more offsets may be configured by using higher layer signaling or may be predefined. For example, the one or more offsets may belong to a K1 set. However, this is not limited in this embodiment of this application. In addition, the one or more offsets may be at a granularity of a sub-time unit, for example, a sub-slot. The higher layer signaling may be, for example, radio resource control (RRC) signaling or a media access control control element (MAC CE).

It may be understood that an ACK/NACK for downlink data transmission in the one or more downlink sub-time units may be fed back in the target uplink sub-time unit.

Optionally, the data transmission opportunity is a time domain position at which a network device may perform downlink data transmission. For example, the data transmission opportunity may be represented by using a start and length indicator value (SLIV).

Optionally, the candidate opportunity corresponds to one or more data transmission opportunities, and one candidate opportunity corresponds to one ACK/NACK feedback. For example, one candidate opportunity may correspond to one HARQ-ACK bit, or a fixed quantity of consecutive HARQ-ACK bits.

In an example, for any candidate opportunity in the candidate opportunity set, if a terminal device receives downlink data transmission (that is, a physical downlink shared channel (PDSCH)) on a data transmission opportunity in one or more data transmission opportunities associated with the candidate opportunity, and an uplink sub-time unit that is determined based on downlink control information (DCI) for scheduling the downlink data transmission and that is used to perform HARQ-ACK feedback for the downlink data transmission is the target uplink sub-time unit, the terminal device sets a decoding result of the downlink data transmission to an ACK or a NACK, where the decoding result is set to the ACK when the PDSCH is correctly decoded, or the decoding result is set to the NACK when the PDSCH is not correctly decoded. If the terminal device does not receive downlink data transmission on any data transmission opportunity in one or more data transmission opportunities associated with the candidate opportunity, or the terminal device receives downlink data transmission on a data transmission opportunity in one or more data transmission opportunities associated with the candidate opportunity, but downlink control information for scheduling the downlink data transmission indicates that feedback information corresponding to the downlink data transmission is not fed back in the target uplink sub-time unit, the terminal device sets a decoding result corresponding to the candidate opportunity or a decoding result of the downlink data transmission to a NACK. In this way, the terminal device sequentially sets a corresponding decoding result, that is, an ACK or a NACK, for each candidate opportunity in the candidate opportunity set, and sequentially concatenates all decoding results, to generate the HARQ-ACK codebook to be fed back in the target sub-time unit. The HARQ-ACK codebook corresponds to the feedback information. After generating the HARQ-ACK codebook, the terminal device may process the HARQ-ACK codebook, for example, map information bits to different signal sequences, or scramble, code, and modulate an information bit, and then map the information bit to a corresponding time-frequency resource, so as to send the information bit to the network device. The network device may determine a bit quantity of the HARQ-ACK codebook based on the candidate opportunity set, to determine a bit quantity of the feedback information, so as to receive the feedback information in different receiving manners. For example, when the bit quantity of the feedback information is less than or equal to 2, the network device may perform sequence detection on a corresponding time-frequency resource, and identify a specific value of the feedback information based on a detected sequence. Alternatively, when the bit quantity of the feedback information is greater than 2, the network device may perform operations such as demodulation, decoding, and descrambling on a received signal on a corresponding time-frequency resource, to obtain a specific value of the feedback information. Finally, based on the specific value of the feedback information, the network device determines whether downlink data sent on each candidate opportunity is received and whether the downlink data is successfully decoded when the downlink data is received, and determines whether retransmission needs to be performed and which data needs to be retransmitted.

According to the wireless communication method provided in this application, the candidate opportunity set may be determined based on the first set corresponding to an uplink sub-time unit (that is, the target uplink sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the uplink sub-time unit is a sub-slot, the method in this application can reduce a feedback latency.

With reference to the first aspect, in some implementations of the first aspect, the candidate opportunity set is a union set of candidate opportunities corresponding to K downlink time units in a second set, the second set includes a downlink time unit corresponding to all downlink sub-time units in the first set, a quantity of downlink time units corresponding to all the downlink sub-time units in the first set is K, and K is a positive integer. A quantity of candidate opportunities corresponding to one downlink time unit in the second set is a maximum quantity of non-overlapping data transmission opportunities included in a data transmission opportunity subset corresponding to the downlink time unit.

Herein, that the downlink sub-time unit corresponds to the downlink time unit means that the downlink sub-time unit is included in the downlink time unit, or the downlink time unit includes the downlink sub-time unit.

It may be understood that the data transmission opportunity subset corresponding to the downlink time unit includes one or more data transmission opportunities. For example, the data transmission opportunity subset corresponding to the downlink time unit consists of the one or more data transmission opportunities.

With reference to the first aspect, in some implementations of the first aspect, the data transmission opportunity set is a union set of data transmission opportunities corresponding to K downlink time units in a second set, the second set includes a downlink time unit corresponding to all downlink sub-time units in the first set, a quantity of downlink time units corresponding to all the downlink sub-time units in the first set is K, and K≥1. An end location of a data transmission opportunity corresponding to a downlink time unit in the second set is in a downlink sub-time unit that is in the first set and that corresponds to the downlink time unit.

According to the wireless communication method provided in this application, a candidate opportunity is obtained based on a downlink time unit instead of a downlink sub-time unit. In this way, candidate opportunity redundancy caused when a data transmission opportunity is segmented based on the downlink sub-time unit can be avoided, thereby avoiding a feedback redundancy increase, a feedback overhead increase, and feedback reliability reduction.

In addition, in the method in this application, when the data transmission opportunity corresponding to the downlink time unit is determined, a data transmission opportunity whose end location is not in the downlink sub-time unit in the first set is excluded, so that feedback redundancy can be further reduced.

It may be understood that, in this application, if an end location of a data transmission opportunity is at a boundary of a downlink time unit (or a downlink sub-time unit), it may also be considered that the end location of the data transmission opportunity is in the downlink time unit (or the downlink sub-time unit).

Optionally, that the data transmission opportunity set is the union set of the data transmission opportunities corresponding to the K downlink time units in the second set may be understood as that the data transmission opportunity set is a union set of data transmission opportunity subsets corresponding to the K downlink time units in the second set.

With reference to the first aspect, in some implementations of the first aspect, the candidate opportunity set is a union set of candidate opportunities corresponding to K downlink time units in a second set, the data transmission opportunity set is a union set of data transmission opportunities corresponding to the K downlink time units in the second set, the second set includes a downlink time unit corresponding to all downlink sub-time units in the first set, a quantity of downlink time units corresponding to all the downlink sub-time units in the first set is K, and K is a positive integer.

A quantity of candidate opportunities corresponding to one downlink time unit in the second set is a maximum quantity of non-overlapping data transmission opportunities included in a data transmission opportunity subset corresponding to the downlink time unit, and an end location of a data transmission opportunity corresponding to the downlink time unit in the second set is in a downlink sub-time unit that is in the first set and that corresponds to the downlink time unit.

Optionally, a data transmission opportunity subset corresponding to a downlink time unit includes all data transmission opportunities corresponding to the downlink time unit.

According to a second aspect, a wireless communication method is provided, including:

determining a candidate opportunity set based on L downlink sub-time units included in a first set, where L is a positive integer, where the L downlink sub-time units correspond to a target uplink sub-time unit, a data transmission opportunity subset corresponding to one of the L downlink sub-time units includes at least one data transmission opportunity, and an end location of the at least one data transmission opportunity is in the downlink sub-time unit; and sending or receiving feedback information in the target uplink sub-time unit, where the feedback information includes a hybrid automatic repeat request acknowledgement HARQ-ACK codebook corresponding to the candidate opportunity set.

Optionally, a length of the downlink sub-time unit is less than a length of one downlink slot, and a length of the uplink sub-time unit is less than a length of one uplink slot. For example, the uplink sub-time unit may be an uplink sub-slot, and the downlink sub-time unit may be a downlink sub-slot. Alternatively, the uplink sub-time unit and the downlink sub-time unit may be collectively referred to as sub-slots.

Optionally, a downlink time unit described below includes two downlink sub-time units; and/or two uplink sub-time units are included in one uplink time unit.

Optionally, the downlink time unit is a downlink slot, and/or the uplink time unit is an uplink slot.

Optionally, one or more downlink sub-time units included in the first set may be determined based on one or more offsets. A time domain offset of the target uplink sub-time unit relative to each of the one or more downlink sub-time units is one of the one or more offsets, and the one or more downlink sub-time units respectively correspond to the one or more offsets. For example, if there are two offsets, the first set may include two downlink sub-time units, and the two downlink sub-time units each correspond to one of the two offsets.

For example, the one or more offsets may be configured by using higher layer signaling or may be predefined. For example, the one or more offsets may belong to a K1 set (set). However, this is not limited in this embodiment of this application. In addition, the one or more offsets may be at a granularity of a sub-time unit, for example, a sub-slot.

It may be understood that an ACK/NACK for downlink data transmission in the one or more downlink sub-time units may be fed back in the target uplink sub-time unit.

Optionally, the candidate opportunity corresponds to one or more data transmission opportunities, and one candidate opportunity corresponds to one ACK/NACK feedback. For example, one candidate opportunity may correspond to one HARQ-ACK bit, or a fixed quantity of consecutive HARQ-ACK bits.

Optionally, the data transmission opportunity is a time domain position at which a network device may perform downlink data transmission. For example, the data transmission opportunity may be represented by using a start and length indicator value (start and length indicator value, SLIV).

For example, each candidate opportunity in the candidate opportunity set has a corresponding ACK/NACK, and a terminal device may determine the HARQ-ACK codebook based on a status of receiving downlink data on the candidate opportunity. After determining the HARQ-ACK codebook, the terminal device may perform operations such as coding and scrambling on the HARQ-ACK codebook, to generate feedback information. Correspondingly, a network device may determine a bit quantity of the HARQ-ACK codebook based on the candidate opportunity set, so that the network device can demodulate and decode the HARQ-ACK codebook, and determine, based on a demodulation and decoding result, whether to perform retransmission and which data is to be retransmitted.

According to the wireless communication method provided in this application, the candidate opportunity set may be determined based on the first set corresponding to an uplink sub-time unit (that is, the target uplink sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the uplink sub-time unit is a sub-slot, the method in this application can reduce a feedback latency. In addition, because none of data transmission opportunity subsets corresponding to the downlink sub-time units in the first set is empty, redundancy of a determined candidate opportunity can be avoided, so that feedback redundancy can be avoided.

With reference to the second aspect, in some implementations of the second aspect, the candidate opportunity set is a union set of candidate opportunities corresponding to N downlink time units in a second set, the second set includes a downlink time unit corresponding to the L downlink sub-time units, a quantity of downlink time units corresponding to the L downlink sub-time units is N, and N is a positive integer.

A quantity of candidate opportunities corresponding to one downlink time unit in the second set is a maximum quantity of non-overlapping data transmission opportunities included in a data transmission opportunity subset corresponding to the downlink time unit, and the data transmission opportunity subset corresponding to the downlink time unit is a union set of downlink data transmission opportunities corresponding to all downlink sub-time units that are in the first set and that belong to the downlink time unit.

According to the wireless communication method provided in this application, the candidate opportunity set can be determined by determining a candidate opportunity corresponding to each of the downlink time units corresponding to the L downlink sub-time units.

With reference to the second aspect, in some implementations of the second aspect, the candidate opportunity set is a union set of candidate opportunities corresponding to the L downlink sub-time units.

A quantity of candidate opportunities corresponding to one downlink sub-time unit in the first set is a maximum quantity of non-overlapping data transmission opportunities included in a data transmission opportunity subset corresponding to the downlink sub-time unit.

According to the wireless communication method provided in this application, the candidate opportunity set can be determined by determining a candidate opportunity corresponding to each of the L downlink sub-time units.

According to a third aspect, a wireless communication method is provided, including: determining a candidate opportunity set, where a quantity of candidate opportunities included in the candidate opportunity set is a maximum quantity of non-overlapping data transmission opportunities included in a data transmission opportunity set, where the data transmission opportunity set corresponds to a first set, the first set includes one or more sub-time units, and the one or more sub-time units correspond to a target sub-time unit; and sending or receiving feedback information in the target sub-time unit, where the feedback information includes a hybrid automatic repeat request acknowledgement HARQ-ACK codebook corresponding to the candidate opportunity set.

Optionally, a length of the sub-time unit is less than a length of one slot. For example, the sub-time unit may be a sub-slot.

Optionally, the sub-time unit includes at least one downlink symbol or flexible symbol, and may be used by a terminal device to receive downlink information, or may be used by a network device to send downlink information.

The target sub-time unit includes at least one uplink symbol or flexible symbol, and may be used by the terminal device to send feedback information, or may be used by the network device to receive feedback information. For example, in a single-carrier time division duplex (time division duplex, TDD) system, the target sub-time unit and the one or more sub-time units are on a same carrier, and have a same length. For example, in a multicarrier TDD system, the one or more sub-time units are on a first carrier (for example, a primary carrier), the one or more sub-time units may be on the first carrier, or may be on a second carrier, and the second carrier is different from the first carrier. In this case, lengths of the target sub-time unit and the one or more sub-time units may be the same or different.

Optionally, a time unit described below includes two sub-time units.

Optionally, the time unit is a slot.

Optionally, the one or more sub-time units included in the first set may be determined based on one or more offsets. A process of determining, based on the one or more offsets, the one or more sub-time units corresponding to the target sub-time unit is similar to that in the first aspect, and details are not described herein.

Meanings of the data transmission opportunity and the candidate opportunity are similar to those in the first aspect, and details are not described herein again. In addition, steps about how the terminal device determines the HARQ-ACK codebook based on data receiving on the candidate opportunity and sends the feedback information are similar to those in the first aspect. Similarly, a process about how the network device receives the feedback information based on a bit quantity of the feedback information is similar to that in the first aspect, and details are not described herein again.

According to the wireless communication method provided in this application, the candidate opportunity set may be determined based on the first set corresponding to a sub-time unit (that is, the target sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the sub-time unit is a sub-slot, the method in this application can reduce a feedback latency.

With reference to the third aspect, in some implementations of the third aspect, the candidate opportunity set is a union set of candidate opportunities corresponding to K time units in a second set, the second set includes a time unit corresponding to all sub-time units in the first set, a quantity of time units corresponding to all the sub-time units in the first set is K, and K is a positive integer. A quantity of candidate opportunities corresponding to one time unit in the second set is a maximum quantity of non-overlapping data transmission opportunities included in a data transmission opportunity subset corresponding to the time unit. Optionally, one of the K time units includes at least one downlink symbol or flexible symbol, and may be used by the terminal device to receive downlink information, or may be used by the network device to send downlink information.

Herein, that the sub-time unit corresponds to the time unit means that the sub-time unit is included in the time unit, or the time unit includes the sub-time unit.

It may be understood that the data transmission opportunity subset corresponding to the time unit includes one or more data transmission opportunities. For example, the data transmission opportunity subset corresponding to the time unit consists of the one or more data transmission opportunities.

With reference to the third aspect, in some implementations of the third aspect, the data transmission opportunity set is a union set of data transmission opportunities corresponding to K time units in a second set, the second set includes a time unit corresponding to all sub-time units in the first set, a quantity of time units corresponding to all the sub-time units in the first set is K, and K≥1. An end location of a data transmission opportunity corresponding to a time unit in the second set is in a sub-time unit that is in the first set and that corresponds to the time unit, and the data transmission opportunity corresponding to the time unit in the second set does not include an uplink symbol. Optionally, one of the K time units includes at least one downlink symbol or flexible symbol, and may be used by the terminal device to receive downlink information, or may be used by the network device to send downlink information.

According to the wireless communication method provided in this application, a candidate opportunity is obtained based on a time unit instead of a sub-time unit. In this way, candidate opportunity redundancy caused when a data transmission opportunity is segmented based on the sub-time unit can be avoided, thereby avoiding a feedback redundancy increase, a feedback overhead increase, and feedback reliability reduction.

In addition, in the method in this application, when the data transmission opportunity corresponding to the time unit is determined, a data transmission opportunity whose end location is not in the sub-time unit in the first set is excluded, so that feedback redundancy can be further reduced.

Optionally, that the data transmission opportunity set is the union set of the data transmission opportunities corresponding to the K time units in the second set may be understood as that the data transmission opportunity set is a union set of data transmission opportunity subsets corresponding to the K time units in the second set.

With reference to the third aspect, in some implementations of the third aspect, the candidate opportunity set is a union set of candidate opportunities corresponding to K time units in a second set, the data transmission opportunity set is a union set of data transmission opportunities corresponding to the K time units in the second set, the second set includes a time unit corresponding to all sub-time units in the first set, a quantity of time units corresponding to all the sub-time units in the first set is K, and K is a positive integer.

A quantity of candidate opportunities corresponding to one time unit in the second set is a maximum quantity of non-overlapping data transmission opportunities included in a data transmission opportunity subset corresponding to the time unit, an end location of a data transmission opportunity corresponding to the time unit in the second set is in a sub-time unit that is in the first set and that corresponds to the time unit, and the data transmission opportunity corresponding to the time unit in the second set does not include an uplink symbol. Optionally, one of the K time units includes at least one downlink symbol or flexible symbol, and may be used by the terminal device to receive downlink information, or may be used by the network device to send downlink information.

Optionally, a data transmission opportunity subset corresponding to a time unit includes all data transmission opportunities corresponding to the time unit.

It may be understood that the flexible symbol is a symbol that may be used for uplink transmission or downlink transmission. In other words, the flexible symbol may be an uplink symbol or a downlink symbol.

According to a fourth aspect, a wireless communication method is provided, including:
determining a candidate opportunity set based on L sub-time units included in a first set, where L is a positive integer, where
the L sub-time units correspond to a target sub-time unit, a data transmission opportunity subset corresponding to one of the L sub-time units includes at least one data transmission opportunity, an end location of the at least one data transmission opportunity is in the sub-time unit, and the at least one data transmission opportunity does not include an uplink symbol; and
sending or receiving feedback information in the target sub-time unit, where the feedback information includes a hybrid automatic repeat request acknowledgement HARQ-ACK codebook corresponding to the candidate opportunity set.

Optionally, a length of the sub-time unit is less than a length of one slot. For example, the sub-time unit may be a sub-slot.

Optionally, the sub-time unit includes at least one downlink symbol or flexible symbol, and may be used by a terminal device to receive downlink information, or may be used by a network device to send downlink information.

The target sub-time unit includes at least one uplink symbol or flexible symbol, and may be used by the terminal device to send feedback information, or may be used by the network device to receive feedback information.

Optionally, a time unit described below includes two sub-time units.

Optionally, the time unit is a slot.

Optionally, the one or more sub-time units included in the first set may be determined based on one or more offsets. A process of determining, based on the one or more offsets, the one or more sub-time units corresponding to the target sub-time unit is similar to that in the first aspect, and details are not described herein.

Meanings of the data transmission opportunity and the candidate opportunity are similar to those in the first aspect or the second aspect, and details are not described herein again. In addition, steps about how the terminal device determines the HARQ-ACK codebook based on data receiving on the candidate opportunity and sends the feedback information are similar to those in the first aspect or the second aspect. Similarly, a process about how the network device receives the feedback information based on a bit quantity of the feedback information is similar to that in the first aspect or the second aspect, and details are not described herein again.

According to the wireless communication method provided in this application, the candidate opportunity set may be determined based on the first set corresponding to a sub-time unit (that is, the target sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the sub-time unit is a sub-slot, the method in this application can reduce a feedback latency. In addition, because none of data transmission opportunity subsets corresponding to the sub-time units in the first set is empty, redundancy of a determined candidate opportunity can be avoided, so that feedback redundancy can be avoided.

With reference to the fourth aspect, in some implementations of the fourth aspect, the candidate opportunity set is a union set of candidate opportunities corresponding to N time units in a second set, the second set includes a time unit corresponding to the L sub-time units, a quantity of time units corresponding to the L sub-time units is N, and N is a positive integer.

A quantity of candidate opportunities corresponding to the time unit in the second set is a maximum quantity of non-overlapping data transmission opportunities included in a data transmission opportunity subset corresponding to the time unit, and the data transmission opportunity subset corresponding to the time unit is a union set of data transmission opportunities corresponding to all sub-time units that are in the first set and that belong to the time unit. Optionally, one of the N time units includes at least one downlink symbol or flexible symbol, and may be used by the terminal device to receive downlink information, or may be used by the network device to send downlink information.

According to the wireless communication method provided in this application, the candidate opportunity set can be determined by determining a candidate opportunity corresponding to each of the time units corresponding to the L sub-time units.

With reference to the fourth aspect, in some implementations of the fourth aspect, the candidate opportunity set is a union set of candidate opportunities corresponding to the L sub-time units.

A quantity of candidate opportunities corresponding to one sub-time unit in the first set is a maximum quantity of non-overlapping data transmission opportunities included in a data transmission opportunity subset corresponding to the sub-time unit.

According to the wireless communication method provided in this application, the candidate opportunity set can be determined by determining a candidate opportunity corresponding to each of the L sub-time units.

It may be understood that the flexible symbol is a symbol that may be used for uplink transmission or downlink transmission. In other words, the flexible symbol may be an uplink symbol or a downlink symbol.

According to a fifth aspect, a communications apparatus is provided, configured to perform the method according to any one of the first aspect to the fourth aspect or the possible implementations of the first aspect to the fourth aspect. Specifically, the apparatus includes units configured to perform the method according to any one of the first aspect to the fourth aspect or the possible implementations of the first aspect to the fourth aspect.

According to a sixth aspect, a communications apparatus is provided. The apparatus includes a transceiver, a memory, and a processor. The transceiver, the memory, and the processor communicate with each other by using an internal connection path. The memory is configured to store instructions. The processor is configured to execute the instructions stored in the memory, to control a receiver to receive a signal and control a transmitter to send a signal. In addition, when the processor executes the instructions stored in the memory, the execution enables the processor to perform the method according to any one of the first aspect to the fourth aspect or the possible implementations of the first aspect to the fourth aspect.

According to a seventh aspect, a computer program product is provided. The computer program product includes computer program code. When the computer program code is run by a computing device, the computing device is enabled to perform the method according to any one of the first aspect to the fourth aspect or the possible implementations of the first aspect to the fourth aspect.

According to an eighth aspect, a computer-readable medium is provided, configured to store a computer program. The computer program includes instructions used to perform the method according to any one of the first aspect to the fourth aspect or the possible implementations of the first aspect to the fourth aspect.

According to a ninth aspect, a chip is provided, including a processor, configured to invoke a computer program from a memory and run the computer program, so that an apparatus on which the chip is installed performs the method according to any one of the first aspect to the fourth aspect or the possible implementations of the first aspect to the fourth aspect.

DESCRIPTION OF EMBODIMENTS

The following describes technical solutions in this application with reference to the accompanying drawings.

The technical solutions in the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or an NR system.

Figure 1:
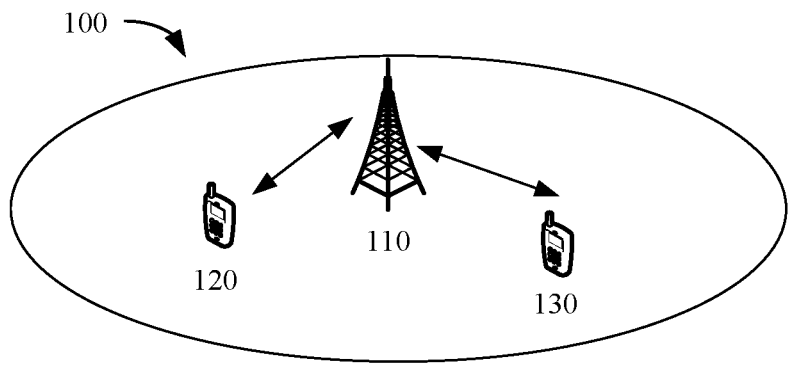
FIG. 1 is a schematic diagram of a communications system applied to this application.

For example, FIG. 1 shows a communications system 100 to which an embodiment of this application is applied. The communications system 100 may include at least one network device, for example, a network device 110 shown in FIG. 1. The network device 110 may be a device, for example, a base station or a base station controller, that communicates with a terminal device. The network device 110 may provide communication coverage for a particular geographical area, and may communicate with a terminal device located in the coverage area (a cell). The network device 110 may be a base transceiver station (BTS) in a global system for mobile communications (GSM) or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the network device may be a relay station, an access point, a vehicle-mounted device, a wearable device, or a network device in a future 5G network, for example, a gNodeB (gNodeB or gNB) or a transmission reception point (transmission receiving point/transmission reception point, TRP) in NR. Alternatively, the network device 110 may be a network device in a future evolved public land mobile network (PLMN), or the like. This is not limited in this embodiment of this application.

The wireless communications system 100 further includes one or more terminal devices located within coverage of the network device 110, for example, a terminal device 120 and a terminal device 130 shown in FIG. 1. The terminal device 120 (or the terminal device 130) may be mobile or fixed. The terminal device 120 may refer to an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in this embodiment of this application.

The system 100 shown in FIG. 1 may be a time division duplex (TDD) system, or may be a frequency division duplex (FDD) system. This is not limited in this application. The following describes the solutions provided in this application.

It may be understood that FIG. 2, FIG. 5, FIG. 6, and FIG. 8 each show detailed communication steps or operations of a method provided in this application, but these steps or operations are merely examples. In the embodiments of this application, other operations or variations of the operations in FIG. 2, FIG. 5, FIG. 6, or FIG. 8 may be alternatively performed. In addition, the steps in the figure may be performed in a different order from that shown in FIG. 2, FIG. 5, FIG. 6, or FIG. 8, and it is possible that not all operations in FIG. 2, FIG. 5, FIG. 6, or FIG. 8 need to be performed.

Figure 2:
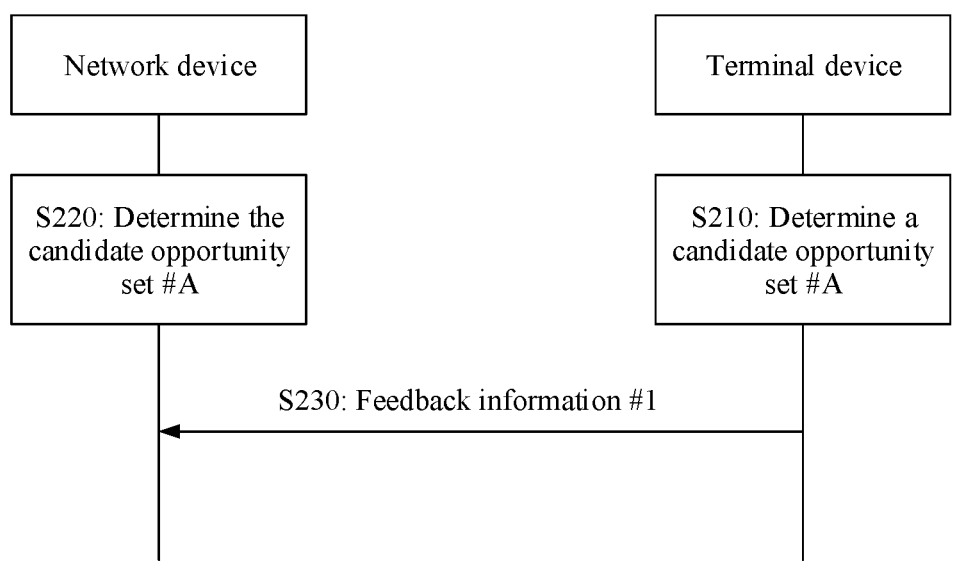
FIG. 2 is a schematic flowchart of a wireless communication method according to this application.

FIG. 2 is a schematic flowchart of a wireless communication method 200 according to this application. The method 200 may be applied to the communications system 100 shown in FIG. 1. However, this embodiment of this application is not limited thereto. The method 200 may include steps S210 to S230. The following describes the steps in detail.

S210: A terminal device determines a candidate opportunity set #A (that is, an example of a candidate opportunity set). A quantity of candidate opportunities included in the candidate opportunity set #A is a maximum quantity of non-overlapping data transmission opportunities included in a data transmission opportunity set #A (that is, an example of a data transmission opportunity set). The foregoing "non-overlapping" may be understood as "non-overlapping" in time domain.

The data transmission opportunity set #A corresponds to a set #1 (that is, an example of a first set), the set #1 includes one or more downlink sub-time units, and the one or more downlink sub-time units correspond to an uplink sub-time unit #1 (that is, an example of a target uplink sub-time unit). That the one or more downlink sub-time units correspond to the uplink sub-time unit #1 means that an ACK/NACK for downlink data transmission in the one or more downlink sub-time units may be fed back in the uplink sub-time unit #1.

The uplink sub-time unit #1 is an uplink sub-time unit used to perform ACK/NACK feedback for specific downlink data transmission (which is denoted as downlink data transmission #1) performed by a network device. In other words, the terminal device performs, in the uplink sub-time unit #1, ACK/NACK feedback for the downlink data transmission #1. An end location of the downlink data transmission #1 is in a downlink sub-time unit #1. For example, an end symbol of the downlink data transmission #1 is in the downlink sub-time unit #1.

For example, the downlink data transmission #1 may be a dynamic physical downlink shared channel (PDSCH). To be specific, the downlink data transmission #1 may be scheduled by using dynamic downlink control information (DCI). Alternatively, the downlink data transmission #1 may be a semi-persistent scheduling (SPS) PDSCH. To be specific, the downlink data transmission #1 may be scheduled by using activation DCI. This is not limited in this application.

The DCI for scheduling the downlink data transmission #1 is denoted as DCI #1 below.

The DCI #1 may include indication information #1. The indication information #1 may indicate location information of the downlink data transmission #1. The location information may be a data transmission opportunity, and the data transmission opportunity indicates a location of a start symbol of the downlink data transmission #1 and a time domain length of the downlink data transmission #1. The terminal device may determine the downlink sub-time unit #1 based on the indication information #1.

The DCI #1 may further include indication information #2. In other words, the indication information #2 may be carried in the DCI #1. The indication information #2 is used to indicate an offset #1, and the offset #1 is a time domain offset of the uplink sub-time unit #1 relative to the downlink sub-time unit #1. The terminal device may determine the uplink sub-time unit #1 based on the indication information #2. For example, an offset in this application, for example, the offset #1, may be at a granularity of a sub-time unit. In other words, the offset is measured by the sub-time unit. It may be understood that the indication information #2 may directly indicate the offset #1, or may indirectly indicate the offset #1. In other words, the offset #1 may be determined based on the indication information #2. It is assumed that a length of the uplink sub-time unit is the same as a length of the downlink sub-time unit. For example, if the indication information #2 is "010", it indicates that the offset #1 is a third value of a plurality of time offsets configured by using higher layer signaling. When the plurality of time offsets configured by using the higher layer signaling are {1, 2, 3, 4, 5, 6, 7, 8}, the time offset indicated by the indication information #2 "010" is three sub-time units. Alternatively, it indicates that an end boundary of the downlink sub-time unit #1 to a start boundary of the uplink sub-time unit #1 span three downlink sub-time units. The indication information #2 may be a value in a PDSCH-to-HARQ-ACK-Timing bit field in the DCI #1. In other words, the indication information #2 is a timing value K1. However, this is not limited in this application. For example, the indication information #2 may alternatively be carried in another bit field in the DCI #1.

Optionally, a length of one downlink sub-time unit may be less than one slot, a length of one uplink sub-time unit may be less than one slot, and the length of the uplink sub-time unit and the length of the downlink sub-time unit may be the same or different. For example, the uplink sub-time unit may be an uplink sub-slot, and the downlink sub-time unit may be a downlink sub-slot. Alternatively, the uplink sub-time unit and the downlink sub-time unit may be collectively referred to as sub-slots.

Optionally, one downlink time unit may include two downlink sub-time units, and/or one uplink time unit may include two uplink sub-time units. For example, one downlink time unit may consist of two downlink sub-time units, and/or one uplink time unit may consist of two uplink sub-time units. For another example, one downlink time unit may consist of three downlink sub-time units, and/or one uplink time unit may consist of three uplink sub-time units.

In this application, one uplink time unit may be one uplink slot, and one downlink time unit may be one downlink slot. However, this is not limited in this application.

It should be noted that this application may be applied to an FDD system, or may be applied to a TDD system. When this application is applied to the TDD system, the uplink sub-time unit and the downlink sub-time unit may be collectively referred to as sub-time units, and the uplink time unit and the downlink time unit may be collectively referred to as time units. However, this is not limited in this application.

In a possible implementation, after determining the uplink sub-time unit #1, the terminal device may determine the set #1 based on indication information #3. The indication information #3 is used to indicate one or more offsets, a time domain offset of the uplink sub-time unit #1 relative to each of the one or more downlink sub-time units is one of the one or more offsets, and the one or more downlink sub-time units respectively correspond to the one or more offsets. For example, if the indication information #3 indicates two offsets, the set #1 may include two downlink sub-time units. A time domain offset of the uplink sub-time unit #1 relative to one of the two downlink sub-time units is one of the two offsets, and a time domain offset of the uplink sub-time unit #1 relative to the other downlink sub-time unit in the two downlink sub-time units is the other offset in the two offsets. The one or more offsets include the offset #1, and the one or more downlink sub-time units include the downlink sub-time unit #1.

The indication information #3 may be configured by a higher layer or may be predefined. For example, the indication information #3 may be a K1 set. However, this is not limited in this embodiment of this application. The "higher layer" in this application may be a layer, such as a media access control (MAC) layer or a radio resource control (RRC) layer, above a physical layer.

Figure 3:
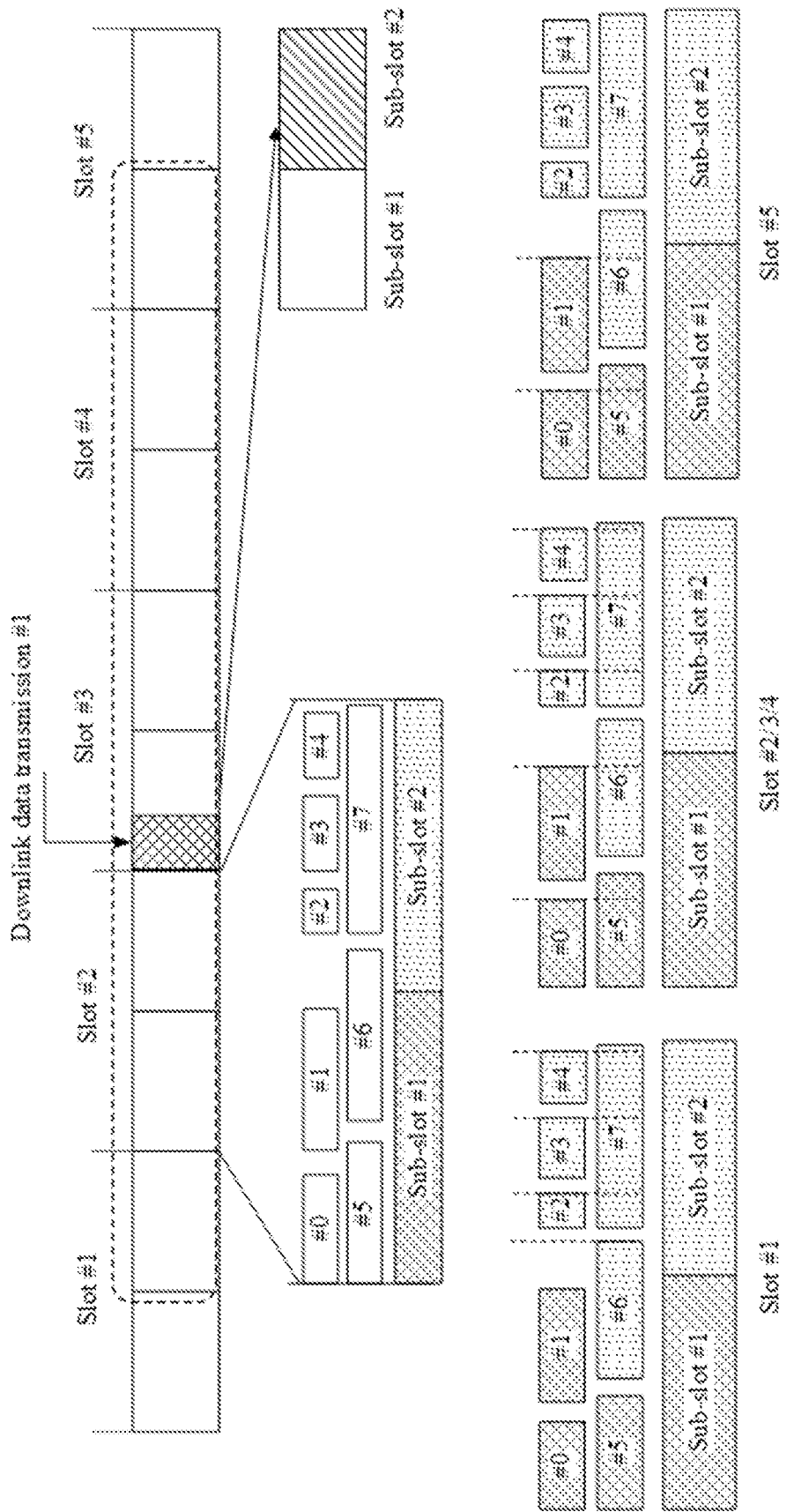
FIG. 3 is a specific example of a wireless communication method according to this application.

For example, FIG. 3 is a schematic diagram of the downlink data transmission #1, the uplink sub-time unit #1, and the set #1.

FIG. 3 uses an example in which the uplink time unit is an uplink slot, the uplink sub-time unit is an uplink sub-slot, one uplink slot includes two uplink sub-slots, the downlink time unit is a downlink slot, the downlink sub-time unit is a downlink sub-slot, and one downlink slot includes two downlink sub-slots. Referring to FIG. 3, the downlink data transmission #1 is in a sub-slot #1 in a slot #3. In other words, the downlink sub-time unit #1 is the sub-slot #1 in the slot #3. The uplink sub-time unit #1 is a sub-slot #2 in a slot #5. In other words, the offset #1 is 5. If the one or more offsets indicated by the indication information #3 are {1, 2, 3, 4, 5, 6, 7, 8}, the set #1 includes sub-time units in a dashed-line box in the figure. To be specific, the set #1 includes a sub-slot #2 in a slot #1, sub-slots #1 and sub-slots #2 in a slot #2 to a slot #4, and a sub-slot #1 in the slot #5.

As described above, the quantity of candidate opportunities included in the candidate opportunity set #A is the maximum quantity of non-overlapping data transmission opportunities included in the data transmission opportunity set #A. For example, in this application, the terminal device may determine the data transmission opportunity set #A based on the set #1, and may determine the candidate opportunity set #A based on the data transmission opportunity set #A.

The data transmission opportunity is a time domain position at which the network device may perform downlink data transmission. For example, the data transmission opportunity may be represented by using a start and length indicator value (start and length indicator value, SLIV). The SLIV indicates a location of a start symbol of downlink data transmission and a time domain length of the downlink data transmission. For ease of description, the data transmission opportunity is briefly denoted as the SLIV below. Correspondingly, the downlink data transmission opportunity set #A is denoted as an SLIV set #A.

The SLIV set #A includes one or more SLIVs. In other words, the one or more downlink sub-time units included in the set #1 may correspond to the one or more SLIVs. The candidate opportunity set #A includes one or more candidate opportunities, and there is a corresponding ACK/NACK feedback for each candidate opportunity.

In this application, for example, the candidate opportunity set #A may be obtained based on an SLIV that ends the earliest and by segmenting the SLIVs included in the SLIV set #A. After the SLIVs included in the SLIV set #A are segmented, all SLIVs in the SLIV set #A are associated with one or more candidate opportunities, and each candidate opportunity is associated with one or more SLIVs that overlap in time domain. The network device performs downlink data transmission on at most one of these SLIVs that overlap in time domain. Therefore, one candidate opportunity corresponds to one ACK/NACK feedback. For example, FIG. 4 is a schematic diagram of SLIV segmentation.

Figure 4:
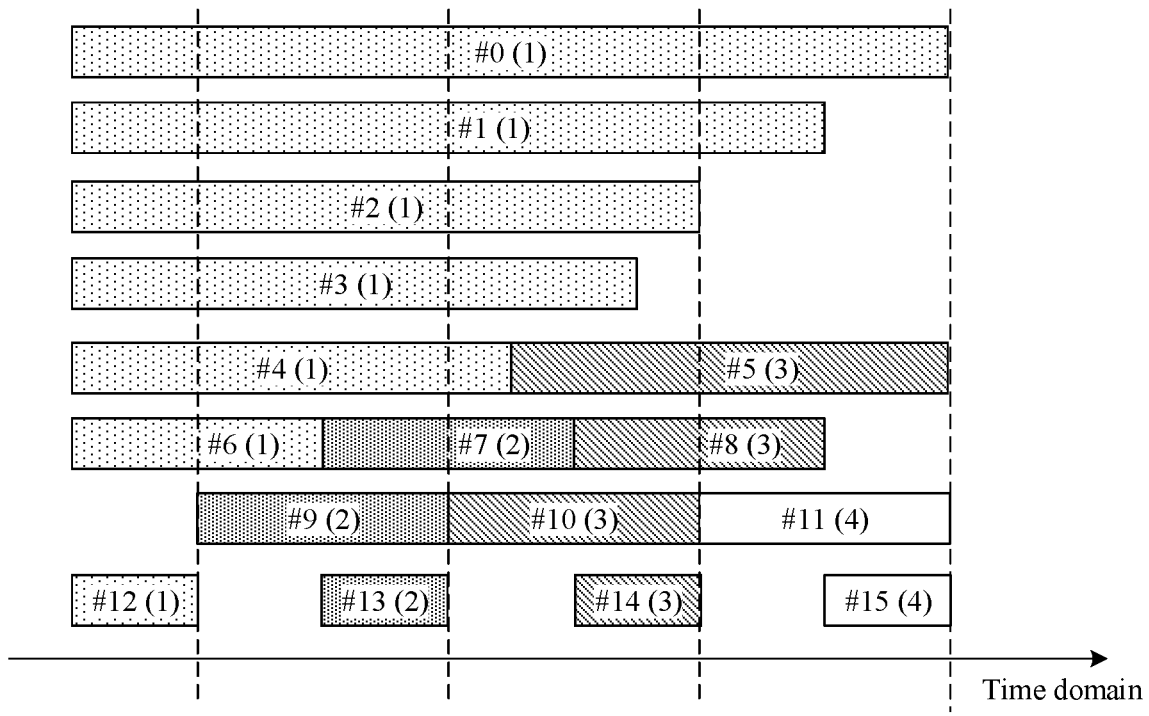
FIG. 4 is a schematic diagram of data transmission opportunity segmentation according to this application.

Referring to FIG. 4, it is assumed that the SLIV set #A includes SLIVs numbered #0 to #15 that are shown in the figure. These 16 SLIVs are segmented: An SLIV with an earliest end symbol is first determined in all the SLIVs, "segmentation" is performed on the end symbol of the SLIV, and all SLIVs that overlap the SLIV are classified into a first group. The first group of SLIVs is removed from the 16 SLIVs. Then, an SLIV with an earliest end symbol is determined again in all remaining SLIVs, segmentation is performed on the end symbol, and all SLIVs that overlap the SLIV are classified into a second group. This process is repeatedly performed, until all the 16 SLIVs are segmented. A segmentation location is shown by a dashed line in the figure. Four groups of SLIVs are obtained after the segmentation, and correspond to four candidate opportunities. SLIVs with a same number in parentheses (in the figure correspond to one candidate opportunity. It can be learned from FIG. 4 that SLIVs respectively included in the four obtained candidate opportunities are {#0, #1, #2, #3, #4, #6, #12}, {#7, #9, #13}, {#5, #8, #10, #14}, and {#11, #15}. In other words, the candidate opportunity set #A corresponds to the SLIVs {{#0, #1, #2, #3, #4, #6, #12}, {#7, #9, #13}, {#5, #8, #10, #14}, and {#11, #15}}.

It may be understood that the segmentation shown in FIG. 4 is a method for obtaining a maximum quantity of non-overlapping data transmission opportunities. This is not limited in this application, and another method may be used to obtain the maximum quantity of non-overlapping data transmission opportunities.

S220: The network device determines the candidate opportunity set #A.

For details of step S220, refer to the foregoing descriptions of step S210. Details are not described herein.

S230: The terminal device sends feedback information #1 (that is, an example of feedback information) in the uplink sub-time unit #1. Correspondingly, the network device receives the feedback information #1 based on the candidate opportunity set #A.

The feedback information #1 includes a HARQ-ACK codebook #1 (that is, an example of a HARQ-ACK codebook). In other words, the feedback information #1 is generated based on the HARQ-ACK codebook #1. The HARQ-ACK codebook #1 is a HARQ-ACK codebook corresponding to the candidate opportunity set #A. In other words, the HARQ-ACK codebook #1 is determined based on a status of receiving downlink data transmission on a candidate opportunity in the candidate opportunity set #A.

For example, for any candidate opportunity in the candidate opportunity set #A, if the terminal device receives downlink data transmission (that is, a PDSCH) on an SLIV in one or more SLIVs associated with the candidate opportunity, and an uplink sub-time unit that is determined based on downlink control information for scheduling the downlink data transmission and that is used to perform HARQ-ACK feedback for the downlink data transmission is the uplink sub-time unit #1, the terminal device sets a decoding result of the downlink data transmission to an ACK or a NACK, where the decoding result is set to the ACK when the PDSCH is correctly decoded, or the decoding result is set to the NACK when the PDSCH is not correctly decoded. If the terminal device does not receive downlink data transmission on any SLIV in one or more SLIVs associated with the candidate opportunity, or the terminal device receives downlink data transmission on an SLIV in one or more SLIVs associated with the candidate opportunity, but downlink control information for scheduling the downlink data transmission indicates that feedback information corresponding to the downlink data transmission is not fed back in the uplink sub-time unit #1, the terminal device sets a decoding result corresponding to the candidate opportunity to a NACK. In this way, the terminal device sets a corresponding decoding result, that is, an ACK or a NACK, for each candidate opportunity in the candidate opportunity set, and concatenates all decoding results in a predefined order or an order configured by the network device, to generate the HARQ-ACK codebook to be fed back in the target sub-time unit. The HARQ-ACK codebook corresponds to the feedback information. After generating the HARQ-ACK codebook, the terminal device may process the HARQ-ACK codebook, for example, map information bits included in the HARQ-ACK codebook to different signal sequences, or code and/or modulate an information bit included in the HARQ-ACK codebook, and then map the information bit to a time-frequency resource, so as to send the information bit to the network device.

For example, the network device may determine a bit quantity of the HARQ-ACK codebook based on the candidate opportunity set, to determine a bit quantity of the feedback information, so as to receive the feedback information in different receiving manners. For example, when the bit quantity of the feedback information is less than or equal to 2, a specific value of the feedback information may be obtained through sequence detection (for example, based on a correspondence between a detected sequence and a specific value of the feedback information). For another example, when the bit quantity of the feedback information is greater than 2, a specific value of the feedback information may be obtained through demodulation and/or decoding. Based on the specific value of the feedback information, the network device determines whether downlink data sent on each candidate opportunity is received and whether the downlink data is successfully decoded when the downlink data is received, and determines whether retransmission needs to be performed and which data needs to be retransmitted.

According to the wireless communication method provided in this application, the candidate opportunity set may be determined based on the first set corresponding to an uplink sub-time unit (that is, the target uplink sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the uplink sub-time unit is a sub-slot, the method in this application can reduce a feedback latency.

In a possible implementation, the candidate opportunity set #A is a union set of candidate opportunities corresponding to K downlink time units in a set #2 (that is, an example of a second set).

The set #2 includes a downlink time unit corresponding to all downlink sub-time units in the set #1, a quantity of downlink time units corresponding to all the downlink sub-time units in the set #1 is K, and K is a positive integer. Herein, that the downlink sub-time unit corresponds to the downlink time unit means that the downlink sub-time unit is included in the downlink time unit, or the downlink time unit includes the downlink sub-time unit. All the downlink sub-time units in the set #1 may be understood as the one or more downlink sub-time units included in the set #1.

One downlink time unit in the set #2 corresponds to one or more candidate opportunities, and the one or more candidate opportunities may also be understood as one candidate opportunity subset. For example, each downlink time unit in the set #2 corresponds to one or more candidate opportunities (in other words, each downlink time unit in the set #2 corresponds to one candidate opportunity subset), and a union set of candidate opportunities corresponding to these downlink time units is the candidate opportunity set #A. A quantity of candidate opportunities corresponding to one downlink time unit in the set #2 is a maximum quantity of non-overlapping SLIVs included in an SLIV subset corresponding to the downlink time unit. For example, for any downlink time unit in the set #2, a quantity of candidate opportunities corresponding to the downlink time unit is a maximum quantity of non-overlapping SLIVs included in an SLIV subset corresponding to the downlink time unit. One SLIV subset includes one or more SLIVs.

FIG. 3 is used as an example for description. The set #2 includes downlink time units corresponding to the sub-time units in the dashed-line box in FIG. 3. In other words, the set #2 includes the slot #1 to the slot #5. A quantity of candidate opportunities corresponding to the slot #1 is a maximum quantity of non-overlapping SLIVs included in an SLIV subset corresponding to the slot #1. A quantity of candidate opportunities corresponding to the slot #2 is a maximum quantity of non-overlapping SLIVs included in an SLIV subset corresponding to the slot #2. A same principle applies to the slot #3, the slot #4, and the slot #5. In a possible implementation, an SLIV in the SLIV subset corresponding to the slot #1 is segmented, and an obtained candidate opportunity is a candidate opportunity corresponding to the slot #1. Candidate opportunities corresponding to the slot #2 to the slot 5 may be obtained in a same manner.

In a possible implementation, the SLIV set #A is a union set of SLIVs corresponding to the K downlink time units in the set #2. One downlink time unit in the set #2 corresponds to one or more SLIVs, and the one or more SLIVs may be considered as one SLIV subset.

A meaning of the K downlink time units is described above, and details are not described herein again. For example, each downlink time unit in the set #2 corresponds to one or more SLIVs. In other words, each downlink time unit corresponds to one SLIV subset, and one SLIV subset includes one or more SLIVs. A union set of SLIV subsets corresponding to all downlink time units in the set #2 is the SLIV set #A.

An end location of an SLIV corresponding to a downlink time unit in the set #2 is in a downlink sub-time unit that is in the set #1 and that corresponds to the downlink time unit. In other words, if a downlink time unit includes a downlink sub-time unit that does not belong to the set #1, an SLIV whose end location is in the downlink sub-time unit that does not belong to the set #1 is not an SLIV corresponding to the downlink time unit. For example, an SLIV (or an SLIV subset) corresponding to any downlink time unit in the set #2 is configured by using higher layer signaling or is predefined. The higher layer signaling may be, for example, a MAC control element (control element, CE) or RRC signaling.

It may be understood from the foregoing description that, in an embodiment of this application, when determining the candidate opportunity set #A, the terminal device may first determine downlink time units corresponding to all the downlink sub-time units in the set #1, and then determine SLIVs corresponding to the downlink time units, or determine SLIV subsets corresponding to the downlink time units. Candidate opportunities corresponding to all downlink time units may be obtained by segmenting SLIVs or SLIV subsets corresponding to all the downlink time units, and these candidate opportunities form the candidate opportunity set #A.

According to the wireless communication method provided in this application, a candidate opportunity is obtained based on a downlink time unit instead of a downlink sub-time unit. In this way, candidate opportunity redundancy caused when an SLIV is segmented based on the downlink sub-time unit can be avoided, thereby avoiding a feedback redundancy increase, a feedback overhead increase, and feedback reliability reduction. For example, SLIVs #0 to #7 shown in FIG. 3 are configured by a higher layer or are predefined. If each sub-slot is separately segmented after the eight SLIVs are classified into two sub-slots, the SLIV #6 may be classified into a sub-slot #2. As a result, the SLIV #1 and the SLIV #6 are not segmented into a same candidate opportunity. However, because the SLIV #1 and the SLIV #6 are overlapped and are not simultaneously used for sending, there is no need to feed back two bits (at least two bits, possibly four or more bits), and only one bit needs to be fed back. It can be learned that there is a feedback redundancy problem when SLIV segmentation is performed based on the downlink sub-time unit. This increases feedback overheads and indirectly reduces feedback reliability. However, in the method in this application, the SLIV #1 and the SLIV #6 are segmented into a same candidate opportunity, so that the foregoing problem can be avoided.

In addition, in the method in this application, when the SLIV corresponding to the downlink time unit is determined, an SLIV whose end location is not in the downlink sub-time unit in the set #1 is excluded, so that feedback redundancy can be further reduced.

With reference to FIG. 3, the following describes this embodiment of this application by using an example in which SLIVs that are configured by a higher layer or are predefined are the SLIVs #0 to #7 shown in FIG. 3.

Referring to FIG. 3, for the slot #1, only the sub-slot #2 belongs to the set #1, and end symbols of SLIVs #0, #1, and #5 are in the sub-slot #1. Therefore, the SLIVs #0, #1, and #5 are not SLIVs or an SLIV subset corresponding to the slot #1. End symbols of SLIVs #2, #3, #4, #6, and #7 are in the sub-slot #2, and therefore the SLIVs #2, #3, #4, #6, and #7 are SLIVs corresponding to the slot #1.

For the slot #2, the slot #3, and the slot #4, all sub-slots #1 and sub-slots #2 belong to the set #1, and end symbols of the SLIVs #0 to #7 each are in the sub-slot #1 or the sub-slot #2. Therefore, all the SLIVs #0 to #7 are corresponding SLIVs.

For the slot #5, only the sub-slot #1 belongs to the set #1, and end symbols of SLIVs #2, #3, #4, #6, and #7 are in the sub-slot #2. Therefore, the SLIVs #2, #3, #4, #6, and #7 are not SLIVs corresponding to the slot #5. End symbols of remaining SLIVs #0, #1, and #5 are in the sub-slot #1, and therefore the SLIVs #0, #1, and #5 are SLIVs corresponding to the slot #5.

After an SLIV corresponding to each slot is determined, the SLIV corresponding to each slot may be segmented, to obtain a candidate opportunity corresponding to each slot.

For the slot #1, four candidate opportunities are obtained after the SLIVs {#2, #3, #4, #6, #7} are segmented, and are denoted as a candidate opportunity #1, a candidate opportunity #2, a candidate opportunity #3, and a candidate opportunity #4. The candidate opportunity #1 is the SLIV {#6}, the candidate opportunity #2 is the SLIVs {#2, #7}, the candidate opportunity #3 is the SLIV {#3}, and the candidate opportunity #4 is the SLIV {#4}. Herein, the candidate opportunities {#1, #2, #3, #4} are candidate opportunities corresponding to the slot #1.

For the slot #2, five candidate opportunities are obtained after the SLIVs {#0, #1, #2, #3, #4, #5, #6, #7} are segmented, and are denoted as a candidate opportunity #5, a candidate opportunity #6, a candidate opportunity #7, a candidate opportunity #8, and a candidate opportunity #9. The candidate opportunity #5 is the SLIVs {#0, #5}, the candidate opportunity #6 is the SLIVs {#1, #6}, the candidate opportunity #7 is the SLIVs {#2, #7}, the candidate opportunity #8 is the SLIV {#3}, and the candidate opportunity #9 is the SLIV {#4}. Herein, the candidate opportunities {#5, #6, #7, #8, #9} are candidate opportunities corresponding to the slot #2.

For the slot #3, five candidate opportunities are obtained after the SLIVs {#0, #1, #2, #3, #4, #5, #6, #7} are segmented, and are denoted as a candidate opportunity #10, a candidate opportunity #11, a candidate opportunity #12, a candidate opportunity #13, and a candidate opportunity #14. The candidate opportunity #10 is the SLIVs {#0, #5}, the candidate opportunity #11 is the SLIVs {#1, #6}, the candidate opportunity #12 is the SLIVs {#2, #7}, the candidate opportunity #13 is the SLIV {#3}, and the candidate opportunity #14 is the SLIV {#4}. Herein, the candidate opportunities {#10, #11, #12, #13, #14} are candidate opportunities corresponding to the slot #3.

For the slot #4, five candidate opportunities are obtained after the SLIVs {#0, #1, #2, #3, #4, #5, #6, #7} are segmented, and are denoted as a candidate opportunity #15, a candidate opportunity #16, a candidate opportunity #17, a candidate opportunity #18, and a candidate opportunity #19. The candidate opportunity #15 is the SLIVs {#0, #5}, the candidate opportunity #16 is the SLIVs {#1, #6}, the candidate opportunity #17 is the SLIVs {#2, #7}, the candidate opportunity #18 is the SLIV {#3}, and the candidate opportunity #19 is the SLIV {#4}. Herein, the candidate opportunities {#15, #16, #17, #18, #19} are candidate opportunities corresponding to the slot #4.

For the slot #5, two candidate opportunities are obtained after the SLIVs {#0, #1, #5} are segmented, and are denoted as a candidate opportunity #20 and a candidate opportunity #21. The candidate opportunity #20 is the SLIVs {#0, #5}, and the candidate opportunity #21 is the SLIV {#1}. Herein, the candidate opportunities {#20, #21} are candidate opportunities corresponding to the slot #5.

The candidate opportunity set #A can be obtained by concatenating the candidate opportunities corresponding to the slot #1 to the slot #5. In other words, the candidate opportunity set #A is the candidate opportunities {#1, #2, . . . , #21}.

A person skilled in the art may understand that, when the method in this application is applied to a TDD system, if an SLIV includes a symbol, a sub-slot, or the like used for uplink, the SLIV does not belong to the SLIV set #A.

Figure 5:
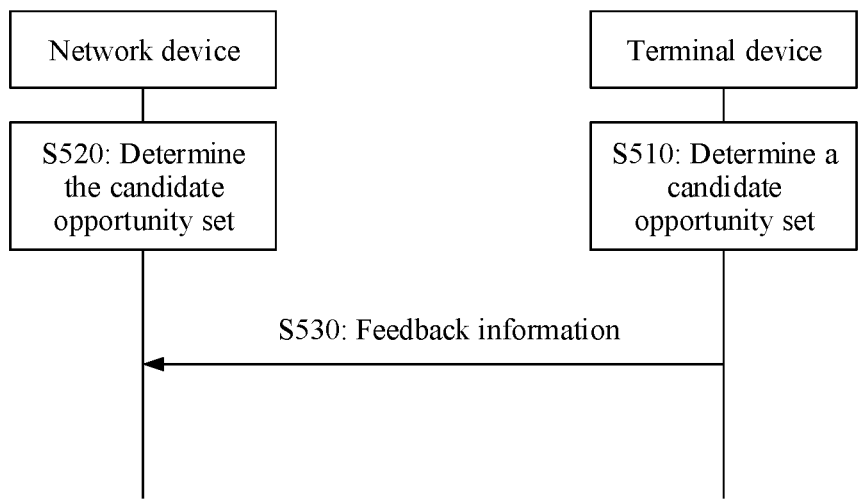
FIG. 5 is a schematic flowchart of another wireless communication method according to this application.

FIG. 5 is a schematic flowchart of another HARQ-ACK codebook transmission method 500 according to this application. The method 500 may be applied to the communications system 100 shown in FIG. 1. However, this embodiment of this application is not limited thereto. The method 500 may include steps S510 to S530. The following describes the steps in detail.

S510: A terminal device determines a candidate opportunity set.

A quantity of candidate opportunities included in the candidate opportunity set is a maximum quantity of non-overlapping data transmission opportunities included in a data transmission opportunity set. The data transmission opportunity set corresponds to a first set, the first set includes one or more sub-time units, and the one or more sub-time units correspond to a target sub-time unit.

Optionally, a length of the sub-time unit is less than a length of one slot. For example, the sub-time unit may be a sub-slot.

Optionally, the sub-time unit may include at least one downlink symbol or flexible symbol, and may be used by the terminal device to receive downlink information, or may be used by a network device to send downlink information.

FIG. 3 is used as an example for description. In FIG. 3, a sub-slot #2 in a slot #1, a sub-slot #1 and a sub-slot #2 in a slot #2, a sub-slot #1 and a sub-slot #2 in a slot #3, a sub-slot #1 and a sub-slot #2 in a slot #4, and a sub-slot #1 in a slot #5 are sub-time units included in the first set.

The target sub-time unit includes at least one uplink symbol or flexible symbol, and may be used by the terminal device to send feedback information, or may be used by the network device to receive feedback information. For example, in a single-carrier TDD system, the target sub-time unit and the one or more sub-time units are on a same carrier, and have a same length. For example, in a multicarrier TDD system, the one or more sub-time units are on a first carrier (for example, a primary carrier), the one or more sub-time units may be on the first carrier, or may be on a second carrier, and the second carrier is different from the first carrier. In this case, lengths of the target sub-time unit and the one or more sub-time units may be the same or different.

FIG. 3 is used as an example for description. The target sub-time unit may be a sub-slot #2 in the slot #5. The sub-slot #2 includes at least one uplink symbol or flexible symbol, and may be used by the terminal device to send feedback information.

Optionally, a time unit described below may include two sub-time units.

Optionally, the time unit is a slot.

Optionally, the one or more sub-time units included in the first set may be determined based on one or more offsets. A process of determining, based on the one or more offsets, the one or more sub-time units corresponding to the target sub-time unit is similar to that in the method 200, and details are not described herein.

Meanings of the data transmission opportunity and the candidate opportunity are similar to those in the method 200, and details are not described herein again.

S520: The terminal device determines the candidate opportunity set.

For details, refer to the description of S510. Details are not described herein.

S530: The terminal device sends feedback information in the target sub-time unit. Correspondingly, the network device receives the feedback information.

The feedback information includes a HARQ-ACK codebook corresponding to the candidate opportunity set.

Steps about how the terminal device determines the HARQ-ACK codebook based on data receiving on the candidate opportunity and sends the feedback information are similar to those in the method 200. Similarly, a process about how the network device receives the feedback information based on a bit quantity of the feedback information is similar to that in the method 200, and details are not described herein again.

According to the wireless communication method provided in this application, the candidate opportunity set may be determined based on the first set corresponding to a sub-time unit (that is, the target sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the sub-time unit is a sub-slot, the method in this application can reduce a feedback latency.

In a possible implementation, the candidate opportunity set is a union set of candidate opportunities corresponding to K time units in a second set, the second set includes a time unit corresponding to all sub-time units in the first set, a quantity of time units corresponding to all the sub-time units in the first set is K, and K is a positive integer. A quantity of candidate opportunities corresponding to one time unit in the second set is a maximum quantity of non-overlapping data transmission opportunities included in a data transmission opportunity subset corresponding to the time unit. Optionally, one of the K time units includes at least one downlink symbol or flexible symbol, and may be used by the terminal device to receive downlink information, or may be used by the network device to send downlink information.

Herein, that the sub-time unit corresponds to the time unit means that the sub-time unit is included in the time unit, or the time unit includes the sub-time unit.

It may be understood that the data transmission opportunity subset corresponding to the time unit includes one or more data transmission opportunities. For example, the data transmission opportunity subset corresponding to the time unit consists of the one or more data transmission opportunities.

For example, FIG. 3 is used as an example for description. In this embodiment of this application, all the sub-time units in the first set may be the sub-slot #2 in the slot #1, the sub-slots #1 and the sub-slots #2 in the slot #2 to the slot #4, and the sub-slot #1 in the slot #5. Correspondingly, the K time units may be the slot #1 to the slot #5.

In another possible implementation, the data transmission opportunity set is a union set of data transmission opportunities corresponding to K time units in a second set, the second set includes a time unit corresponding to all sub-time units in the first set, a quantity of time units corresponding to all the sub-time units in the first set is K, and K is a positive integer. An end location of a data transmission opportunity corresponding to a time unit in the second set is in a sub-time unit that is in the first set and that corresponds to the time unit, and the data transmission opportunity corresponding to the time unit in the second set does not include an uplink symbol. Optionally, one of the K time units includes at least one downlink symbol or flexible symbol, and may be used by the terminal device to receive downlink information, or may be used by the network device to send downlink information.

The slot #1 in FIG. 3 is used as an example for description. If there is an SLIV including an uplink symbol in SLIVs #2, #3, #4, #6, and #7 of the sub-slot #2 in the slot #1, the SLIV does not belong to an SLIV or an SLIV subset corresponding to the slot #1. For example, if only the SLIV #6 in the SLIVs #2, #3, #4, #6, and #7 includes an uplink symbol, it may be determined that SLIVs corresponding to the slot #1 are the SLIVs #2, #3, #4, and #7.

According to the wireless communication method provided in this application, a candidate opportunity is obtained based on a time unit instead of a sub-time unit. In this way, candidate opportunity redundancy caused when a data transmission opportunity is segmented based on the sub-time unit can be avoided, thereby avoiding a feedback redundancy increase, a feedback overhead increase, and feedback reliability reduction.

In addition, in the method in this application, when the data transmission opportunity corresponding to the time unit is determined, a data transmission opportunity whose end location is not in the sub-time unit in the first set is excluded, so that feedback redundancy can be further reduced.

It may be understood that the foregoing two implementations may be used separately, or may be used in combination.

Optionally, that the data transmission opportunity set is the union set of the data transmission opportunities corresponding to the K time units in the second set may be understood as that the data transmission opportunity set is a union set of data transmission opportunity subsets corresponding to the K time units in the second set.

Optionally, a data transmission opportunity subset corresponding to a time unit includes all data transmission opportunities corresponding to the time unit.

It may be understood that the flexible symbol is a symbol that may be used for uplink transmission or downlink transmission. In other words, the flexible symbol may be an uplink symbol or a downlink symbol.

Figure 6:
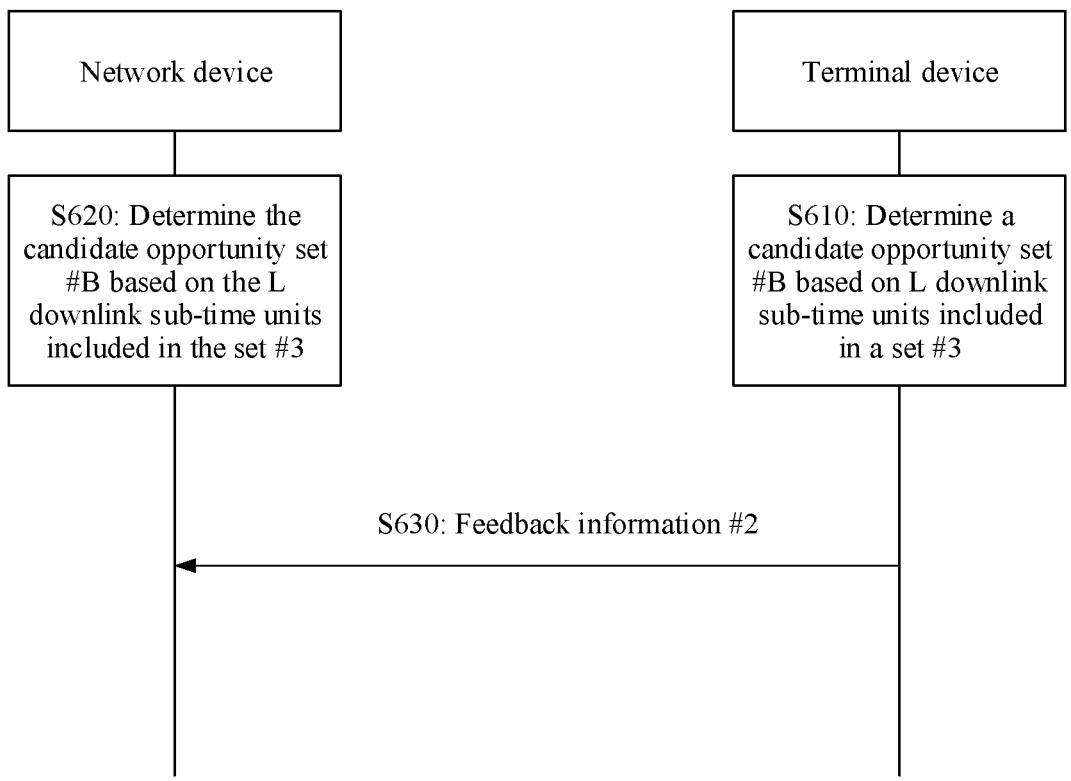
FIG. 6 is a schematic flowchart of another wireless communication method according to this application.

FIG. 6 is a schematic flowchart of another HARQ-ACK codebook transmission method 600 according to this application. The method 600 may be applied to the communications system 100 shown in FIG. 1. However, this embodiment of this application is not limited thereto. The method 600 may include steps S610 to S630. The following describes the steps in detail.

S610: A terminal device determines a candidate opportunity set #B (an example of a candidate opportunity set) based on L downlink sub-time units included in a set #3 (an example of a first set), where L≥1.

The L downlink sub-time units correspond to an uplink sub-time unit #2 (that is, an example of a target uplink sub-time unit). That the L downlink sub-time units correspond to the uplink sub-time unit #2 means that an ACK/NACK for downlink data transmission in the L downlink sub-time units may be fed back in the uplink sub-time unit #2.

The uplink sub-time unit #2 is similar to the uplink sub-time unit #1 described above. Optionally, the uplink sub-time unit #2 is the uplink sub-time unit #1. For details about the uplink sub-time unit #2, refer to the foregoing described uplink sub-time unit #1. Details are not described herein.

It may be understood that for a length of the downlink sub-time unit, a length of the uplink sub-time unit, a relationship between a downlink sub-time unit and a downlink time unit, and a relationship between an uplink sub-time unit and an uplink time unit in this application, refer to the foregoing descriptions of the method 200. Details are not described herein again.

A data transmission opportunity subset corresponding to one of the L downlink sub-time units includes at least one data transmission opportunity, and an end location of the at least one data transmission opportunity is in the downlink sub-time unit. For ease of understanding and description, the data transmission opportunity is denoted as an SLIV below. Correspondingly, the data transmission opportunity subset is denoted as an SLIV subset, and a data transmission opportunity set is denoted as an SLIV set.

For example, the L downlink sub-time units are valid downlink sub-time units in M downlink sub-time units, where M≥1. The valid downlink sub-time unit is a downlink sub-time unit whose corresponding SLIV subset is not an empty set. The M downlink sub-time units may be determined based on the indication information #3 described above or information similar to the indication information #3. Alternatively, it may be considered that the M downlink sub-time units are the sub-time units in the set #1 described above. The M downlink sub-time units are not described in detail herein. For details, refer to the foregoing description of the set #1.

In a possible implementation, the terminal device may first determine SLIV subsets corresponding to a plurality of downlink sub-time units that form one downlink time unit. For any downlink sub-time unit in a downlink time unit, an SLIV subset corresponding to the downlink sub-time unit includes an SLIV, whose end location (for example, an end symbol) is in the downlink sub-time unit, in an SLIV set that is configured by using higher layer signaling or is predefined. After determining the SLIV subsets corresponding to the plurality of downlink sub-time units that form one downlink time unit, the terminal device may determine, based on locations of the M downlink sub-time units in corresponding downlink time units, an SLIV subset corresponding to each of the M downlink sub-time units. If an SLIV subset corresponding to a downlink sub-time unit is an empty set, the downlink sub-time unit does not belong to the L downlink sub-time units. If an SLIV subset corresponding to a downlink sub-time unit is not an empty set, the downlink sub-time unit belongs to the L downlink sub-time units. It may be understood that the L downlink sub-time units may be downlink sub-time units whose corresponding SLIV subsets each are not an empty set in the M downlink sub-time units.

Figure 7:
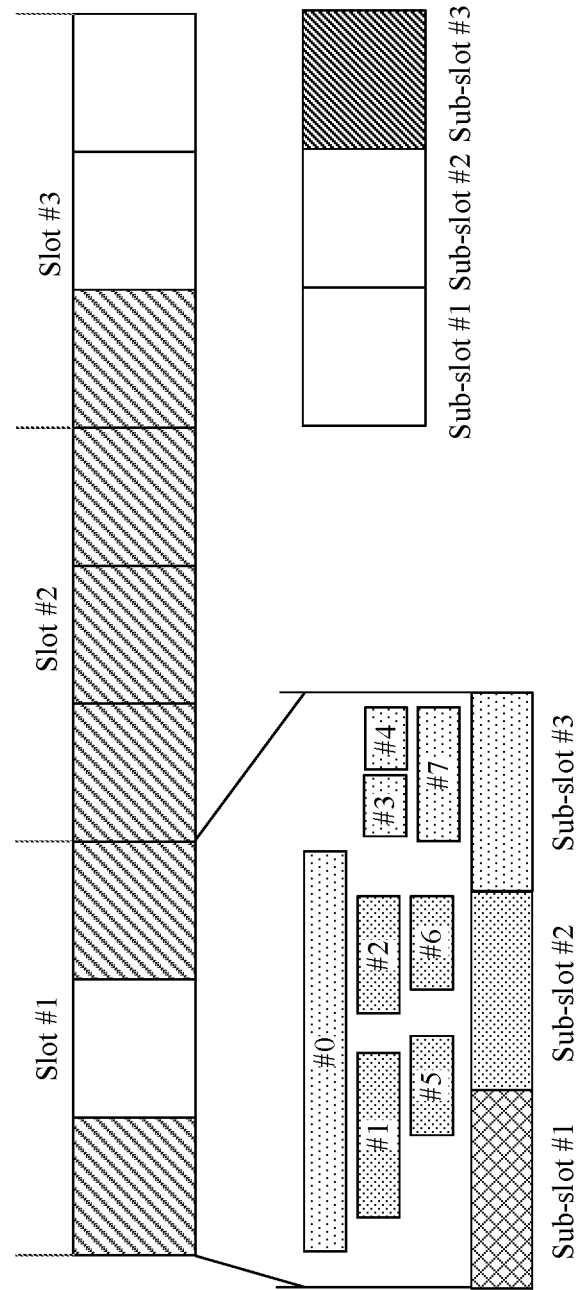
FIG. 7 is another specific example of a wireless communication method according to this application.

An example shown in FIG. 7 is used for description. Referring to FIG. 7, a downlink time unit is a slot, a downlink sub-time unit is a sub-slot, and one slot includes three sub-slots. An SLIV set includes SLIVs {#0, #1, #2, #3, #4, #5, #6, #7} shown in the figure. For a sub-slot #1 in a slot, because there is no SLIV whose end symbol is in the sub-slot #1, an SLIV subset corresponding to the sub-slot #1 is empty. For a sub-slot #2 in a slot, only SLIVs numbered #1, #2, #5, and #6 are in the sub-slot #2. Therefore, an SLIV subset corresponding to the sub-slot #2 is SLIVs {#1, #2, #5, #6}. For a sub-slot #3 in a slot, SLIVs numbered #0, #3, #4, and #7 are in the sub-slot #3. Therefore, an SLIV subset corresponding to the sub-slot #3 is SLIVs {#0, #3, #4, #7}.

Further, as shown in FIG. 7, for example, the uplink sub-time unit #2 is a sub-slot #3 in a slot #3. The M downlink sub-time units are determined by using a K1 set, and the K1 set={2, 3, 4, 5, 6, 8}. In this case, the M downlink sub-time units include a sub-slot 1 and a sub-slot #3 in a slot #1, a sub-slot 1 to a sub-slot #3 in a slot #2, and a sub-slot #1 in the slot #3. For a slot, an SLIV subset corresponding to a sub-slot #1 is empty. Therefore, none of the sub-slots #1 in the slot #1, the slot #2, and the slot #3 belongs to the set #3. The set #3 includes the sub-slot #3 in the slot #1, and the sub-slot #2 and the sub-slot #3 that are in the slot #2.

S620: A network device determines the candidate opportunity set #B based on the L downlink sub-time units included in the set #3.

For details of step S620, refer to the descriptions of step S610. Details are not described herein.

S630: The terminal device sends feedback information #2 (that is, an example of feedback information) in the uplink sub-time unit #2. Correspondingly, the network device receives the feedback information #2 based on the candidate opportunity set #B.

The feedback information #2 includes a HARQ-ACK codebook #2 (that is, an example of a HARQ-ACK codebook). In other words, the feedback information #2 is generated based on the HARQ-ACK codebook #2. The HARQ-ACK codebook #2 is a HARQ-ACK codebook corresponding to the candidate opportunity set #B. In other words, the HARQ-ACK codebook #2 is determined based on a status of receiving downlink data transmission on a candidate opportunity in the candidate opportunity set #B.

For example, each candidate opportunity in the candidate opportunity set #B has a corresponding ACK/NACK, and the terminal device may determine the HARQ-ACK codebook #2 based on a status of receiving downlink data on the candidate opportunity. After determining the HARQ-ACK codebook #2, the terminal device may process the HARQ-ACK codebook #2, for example, map information bits included in the HARQ-ACK codebook #2 to different signal sequences, or code and/or modulate an information bit included in the HARQ-ACK codebook #2, and then map the information bit to a time-frequency resource, so as to send the information bit to the network device.

For example, the network device may determine a bit quantity of the HARQ-ACK codebook #2 based on the candidate opportunity set #B, to determine a bit quantity of the feedback information, so as to receive the feedback information in different receiving manners. For example, when the bit quantity of the feedback information is less than or equal to 2, a specific value of the feedback information may be obtained through sequence detection (for example, based on a correspondence between a detected sequence and a specific value of the feedback information). For another example, when the bit quantity of the feedback information is greater than 2, a specific value of the feedback information may be obtained through demodulation and/or decoding. Based on the specific value of the feedback information, the network device determines whether downlink data sent on each candidate opportunity is received and whether the downlink data is successfully decoded when the downlink data is received, and determines whether retransmission needs to be performed and which data needs to be retransmitted.

According to the wireless communication method provided in this application, the candidate opportunity set may be determined based on the first set corresponding to an uplink sub-time unit (that is, the target uplink sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the uplink sub-time unit is a sub-slot, the method in this application can reduce a feedback latency. In addition, because none of SLIV subsets corresponding to the downlink sub-time units in the first set is empty, redundancy of a determined candidate opportunity can be avoided, so that feedback redundancy can be avoided.

Optionally, in an embodiment of this application, the candidate opportunity set #B (that is, an example of a candidate opportunity) is a union set of candidate opportunities corresponding to N downlink time units in a set #4 (that is, an example of a second set), and N is a positive integer.

The set #4 includes a downlink time unit corresponding to the L downlink sub-time units in the set #3, and a quantity of downlink time units corresponding to the L downlink sub-time units in the set #3 is N. Herein, that the downlink sub-time unit corresponds to the downlink time unit means that the downlink sub-time unit is included in the downlink time unit, or the downlink time unit includes the downlink sub-time unit.

One downlink time unit in the set #4 corresponds to one or more candidate opportunities, and the one or more candidate opportunities may also be understood as one candidate opportunity subset. For example, each downlink time unit in the set #4 corresponds to one or more candidate opportunities (in other words, each downlink time unit in the set #4 corresponds to one candidate opportunity subset), and a union set of candidate opportunities corresponding to these downlink time units is the candidate opportunity set #B. A quantity of candidate opportunities corresponding to one downlink time unit in the set #4 is a maximum quantity of non-overlapping SLIVs included in an SLIV subset corresponding to the downlink time unit. For example, for any downlink time unit in the set #4, a quantity of candidate opportunities corresponding to the downlink time unit is a maximum quantity of non-overlapping SLIVs included in an SLIV subset corresponding to the downlink time unit. One SLIV subset includes one or more SLIVs. A data transmission opportunity subset corresponding to one downlink time unit in the set #4 is a union set of downlink data transmission opportunities corresponding to all downlink sub-time units that are in the set #2 and that belong to the downlink time unit.

FIG. 7 is used as an example for description. The set #2 includes downlink time units corresponding to the sub-slot #3 in the slot #1, and the sub-slot #2 and the sub-slot #3 that are in the slot #2. In other words, the set #4 includes the slot #1 and the slot #2. A quantity of candidate opportunities corresponding to the slot #1 is a maximum quantity of non-overlapping SLIVs included in an SLIV subset corresponding to the slot #1. A quantity of candidate opportunities corresponding to the slot #2 is a maximum quantity of non-overlapping SLIVs included in an SLIV subset corresponding to the slot #2. In a possible implementation, an SLIV in the SLIV subset corresponding to the slot #1 is segmented, and an obtained candidate opportunity is a candidate opportunity corresponding to the slot #1. A candidate opportunity corresponding to the slot #2 may be obtained in a same manner.

It can be learned from the foregoing description that, in a possible implementation, the terminal device may first determine the downlink time units corresponding to all the downlink sub-time units in the set #3, and then may determine SLIV subsets corresponding to these downlink time units. Candidate opportunities corresponding to all downlink time units can be obtained by segmenting SLIVs in all SLIV subsets. A union set of these candidate opportunities is the candidate opportunity set #B.

The following describes this embodiment of this application by using an example with reference to FIG. 7.

The SLIV subset corresponding to the slot #1 is a union set of SLIV subsets corresponding to all downlink sub-time units that are in the set #3 and that belong to the slot #1. In other words, the SLIV subset corresponding to the slot #1 is an SLIV subset corresponding to the sub-slot #3 in the slot #1. The SLIV subset corresponding to the sub-slot #3 in the slot #1 is SLIVs {#0, #3, #4, #7}. Therefore, the SLIV subset corresponding to the slot #1 is the SLIVs {#0, #3, #4, #7}.

The SLIV subset corresponding to the slot #2 is a union set of SLIV subsets corresponding to all downlink sub-time units that are in the set #3 and that belong to the slot #2. In other words, the SLIV subset corresponding to the slot #2 is a union set of an SLIV subset corresponding to the sub-slot #2 in the slot #2 and an SLIV subset corresponding to the sub-slot #3 in the slot #2. The SLIV subset corresponding to the sub-slot #2 in the slot #2 is SLIVs {#1, #2, #5, #6}, and the SLIV subset corresponding to the sub-slot #3 in the slot #2 is SLIVs {#0, #3, #4, #7}. Therefore, the SLIV subset corresponding to the slot #2 is the SLIVs {#0, #1, #2, #3, #4, #5, #6, #7}.

For the slot #1, three candidate opportunities are obtained after the SLIVs {#0, #3, #4, #7} are segmented, and are denoted as a candidate opportunity #1, a candidate opportunity #2, and a candidate opportunity #3. The candidate opportunity #1 is the SLIV {#0}, the candidate opportunity #2 is the SLIVs {#3, #7}, and the candidate opportunity #3 is the SLIV {#4}. Herein, the candidate opportunities {#1, #2, #3} are candidate opportunities corresponding to the slot #1.

For the slot #2, four candidate opportunities are obtained after the SLIVs {#0, #1, #2, #3, #4, #5, #6, #7} are segmented, and are denoted as a candidate opportunity #4, a candidate opportunity #5, a candidate opportunity #6, and a candidate opportunity #7. The candidate opportunity #4 is the SLIVs {#0, #1, #5}, the candidate opportunity #5 is the SLIVs {#2, #6}, the candidate opportunity #6 is the SLIVs {#3, #7}, and the candidate opportunity #7 is the SLIV {#4}. Herein, the candidate opportunities {#4, #5, #6, #7} are candidate opportunities corresponding to the slot #2.

The candidate opportunity set #B can be obtained by concatenating the candidate opportunities corresponding to the slot #1 and the slot #2. In other words, the candidate opportunity set #B is the candidate opportunities {#1, #2, . . . , #7}.

In a possible implementation, the candidate opportunity set #B is a union set of candidate opportunities corresponding to the L downlink sub-time units in the set #3. A quantity of candidate opportunities corresponding to one of the L downlink sub-time units is a maximum quantity of non-overlapping data transmission opportunities included in a data transmission opportunity subset corresponding to the downlink sub-time unit. For example, for any downlink sub-time unit in the set #3, a quantity of candidate opportunity subsets corresponding to the downlink sub-time unit is a maximum quantity of non-overlapping data transmission opportunities included in a data transmission opportunity subset corresponding to the downlink sub-time unit.

In a possible implementation, the terminal device may first determine SLIV subsets corresponding to all the downlink sub-time units in the set #3, and may obtain, by segmenting SLIVs in all the SLIV subsets, candidate opportunities corresponding to all the downlink sub-time units. A union set of these candidate opportunities is the candidate opportunity set #B.

The following describes this embodiment of this application by using an example with reference to FIG. 7.

As described above, the set #3 includes the sub-slot #3 in the slot #1, and the sub-slot #2 and the sub-slot #3 that are in the slot #2. The network device may first determine SLIV subsets corresponding to these sub-slots. The SLIV subset corresponding to the sub-slot #3 in the slot #1 is the SLIVs {#0, #3, #4, #7}, the SLIV subset corresponding to the sub-slot #2 in the slot #2 is the SLIVs{#1, #2, #5, #6}, and the SLIV subset corresponding to the sub-slot #3 in the slot #2 is the SLIVs {#0, #3, #4, #7}.

For the sub-slot #3 in the slot #1, three candidate opportunities are obtained after the SLIVs {#0, #3, #4, #7} are segmented, and are denoted as a candidate opportunity #1, a candidate opportunity #2, and a candidate opportunity #3. The candidate opportunity #1 is the SLIV {#0}, the candidate opportunity #2 is the SLIVs {#3, #7}, and the candidate opportunity #3 is the SLIV {#4}. Herein, the candidate opportunities {#1, #2, #3} are candidate opportunities corresponding to the sub-slot #3 in the slot #1.

For the sub-slot #2 in the slot #2, two candidate opportunities are obtained after the SLIVs {#1, #2, #5, #6} are segmented, and are denoted as a candidate opportunity #4 and a candidate opportunity #5. The candidate opportunity #4 is the SLIVs {#1, #5}, and the candidate opportunity #5 is the SLIVs {#2, #6}. Herein, the candidate opportunities {#4, #5} are candidate opportunities corresponding to the sub-slot #2 in the slot #2.

For the sub-slot #3 in the slot #2, three candidate opportunities are obtained after the SLIVs {#0, #3, #4, #7} are segmented, and are denoted as a candidate opportunity #6, a candidate opportunity #7, and a candidate opportunity #8. The candidate opportunity #6 is the SLIV {#0}, the candidate opportunity #7 is the SLIVs {#3, #7}, and the candidate opportunity #8 is the SLIV {#4}. Herein, the candidate opportunities {#6, #7, #8} are candidate opportunities corresponding to the sub-slot #3 in the slot #2.

The candidate opportunity set #B can be obtained by concatenating the candidate opportunities corresponding to the sub-slot #3 in the slot #1, and the sub-slot #2 and the sub-slot #3 that are in the slot #2. In other words, the candidate opportunity set #B is the candidate opportunities {#1, #2, . . . , #8}.

Figure 8:
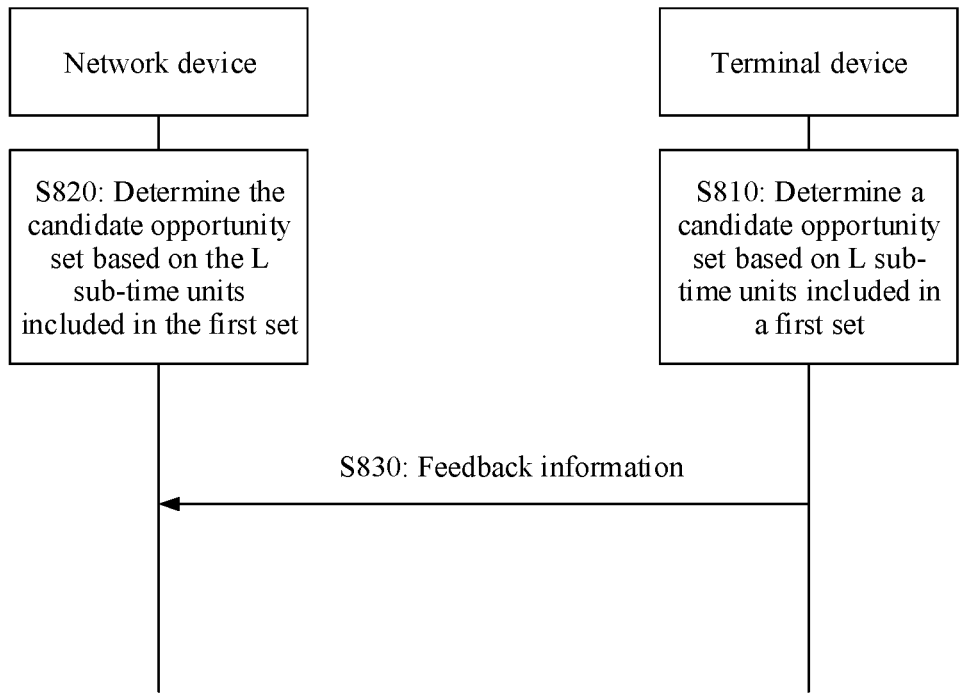
FIG. 8 is a schematic flowchart of another wireless communication method according to this application.

FIG. 8 is a schematic flowchart of another HARQ-ACK codebook transmission method 800 according to this application. The method 800 may be applied to the communications system 100 shown in FIG. 1. However, this embodiment of this application is not limited thereto. The method 800 may include steps S810 to S830. The following describes the steps in detail.

S810: A terminal device determines a candidate opportunity set based on L sub-time units included in a first set, where L is a positive integer.

The L sub-time units correspond to a target sub-time unit, a data transmission opportunity subset corresponding to one of the L sub-time units includes at least one data transmission opportunity, an end location of the at least one data transmission opportunity is in the sub-time unit, and the at least one data transmission opportunity does not include an uplink symbol.

Optionally, a length of the sub-time unit is less than a length of one slot. For example, the sub-time unit may be a sub-slot.

Optionally, the sub-time unit includes at least one downlink symbol or flexible symbol, and may be used by the terminal device to receive downlink information, or may be used by a network device to send downlink information.

FIG. 7 is used as an example for description. If the target sub-time unit is a sub-slot #3 in a slot #3, and a K1 set={2, 3, 4, 5, 6, 8}, sub-slots #1, #2, and #3 in a slot #2 all correspond to the target sub-time unit, and all may belong to the L sub-time units. Because none of end symbols of SLIVs #0 to #7 is in a sub-slot #1, the sub-slot #1 in the slot #2 does not belong to the L sub-time units. For the sub-slot #2 in the slot #2, end symbols of SLIVs #1, #2, #5, and #6 are in the sub-slot #2. However, if the SLIVs #1, #2, #5, and #6 each include an uplink symbol, these SLIVs each do not belong to the sub-slot #2, and the sub-slot #2 does not belong to the L sub-time units. Similarly, for the sub-slot #3 in the slot #2, end symbols of SLIVs #0, #3, #4, and #7 are in the sub-slot #3. However, if only the SLIV #0 in the SLIVs #0, #3, #4, and #7 includes an uplink symbol, the SLIVs #3, #4, and #7 belong to the sub-slot #3, and the sub-slot #3 belongs to the L sub-time units.

The target sub-time unit includes at least one uplink symbol or flexible symbol, and may be used by the terminal device to send feedback information, or may be used by the network device to receive feedback information. For example, in a single-carrier TDD system, the target sub-time unit and the one or more sub-time units are on a same carrier, and have a same length. For example, in a multicarrier TDD system, the one or more sub-time units are on a first carrier (for example, a primary carrier), the one or more sub-time units may be on the first carrier, or may be on a second carrier, and the second carrier is different from the first carrier. In this case, lengths of the target sub-time unit and the one or more sub-time units may be the same or different.

FIG. 7 is used as an example for description. The target sub-time unit may be a sub-slot #3 in the slot #3. The sub-slot #3 includes at least one uplink symbol or flexible symbol, and may be used by the terminal device to send feedback information.

Optionally, a time unit described below includes two sub-time units.

Optionally, the time unit is a slot.

Optionally, one or more sub-time units included in the first set may be determined based on one or more offsets. A process of determining, based on the one or more offsets, the one or more sub-time units corresponding to the target sub-time unit is similar to that in the method 600 or the method 200, and details are not described herein.

Meanings of the data transmission opportunity and the candidate opportunity are similar to those in the method 600 or the method 200, and details are not described herein again.

S820: The network device determines the candidate opportunity set based on the L sub-time units included in the first set.

For details, refer to the foregoing description of S810. Details are not described herein.

S830: The terminal device sends feedback information in the target sub-time unit. Correspondingly, the network device receives the feedback information in the target sub-time unit. The feedback information includes a HARQ-ACK codebook corresponding to the candidate opportunity set.

Steps about how the terminal device determines the HARQ-ACK codebook based on data receiving on the candidate opportunity and sends the feedback information are similar to those in the method 600 or the method 200. Similarly, a process about how the network device receives the feedback information based on a bit quantity of the feedback information is similar to that in the method 600 or the method 200, and details are not described herein again.

According to the wireless communication method provided in this application, the candidate opportunity set may be determined based on the first set corresponding to a sub-time unit (that is, the target sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the sub-time unit is a sub-slot, the method in this application can reduce a feedback latency. In addition, because none of data transmission opportunity subsets corresponding to the sub-time units in the first set is empty, redundancy of a determined candidate opportunity can be avoided, so that feedback redundancy can be avoided.

In a possible implementation, the candidate opportunity set is a union set of candidate opportunities corresponding to N time units in a second set, the second set includes a time unit corresponding to the L sub-time units, a quantity of time units corresponding to the L sub-time units is N, and N is a positive integer.

A quantity of candidate opportunities corresponding to the time unit in the second set is a maximum quantity of non-overlapping data transmission opportunities included in a data transmission opportunity subset corresponding to the time unit, and the data transmission opportunity subset corresponding to the time unit is a union set of data transmission opportunities corresponding to all sub-time units that are in the first set and that belong to the time unit. Optionally, one of the N time units includes at least one downlink symbol or flexible symbol, and may be used by the terminal device to receive downlink information, or may be used by the network device to send downlink information.

According to the wireless communication method provided in this embodiment of this application, the candidate opportunity set can be determined by determining a candidate opportunity corresponding to each of the time units corresponding to the L sub-time units.

In another possible implementation, the candidate opportunity set is a union set of candidate opportunities corresponding to the L sub-time units. A quantity of candidate opportunities corresponding to one sub-time unit in the first set is a maximum quantity of non-overlapping data transmission opportunities included in a data transmission opportunity subset corresponding to the sub-time unit.

According to the wireless communication method provided in this embodiment of this application, the candidate opportunity set can be determined by determining a candidate opportunity corresponding to each of the L sub-time units.

It may be understood that the foregoing two implementations may be used separately, or may be used in combination.

It may be understood that the flexible symbol in this application is a symbol that may be used for uplink transmission or downlink transmission. In other words, the flexible symbol may be an uplink symbol or a downlink symbol. The flexible symbol may be set to the uplink symbol or the downlink symbol based on uplink and downlink transmission requirements.

In correspondence to the wireless communication methods provided in the foregoing method embodiments, an embodiment of this application further provides a corresponding communications apparatus (which may also be referred to as a communications device). The communications apparatus includes a corresponding module configured to perform each part in the foregoing embodiments. The module may be software, hardware, or a combination of software and hardware.

Figure 9:
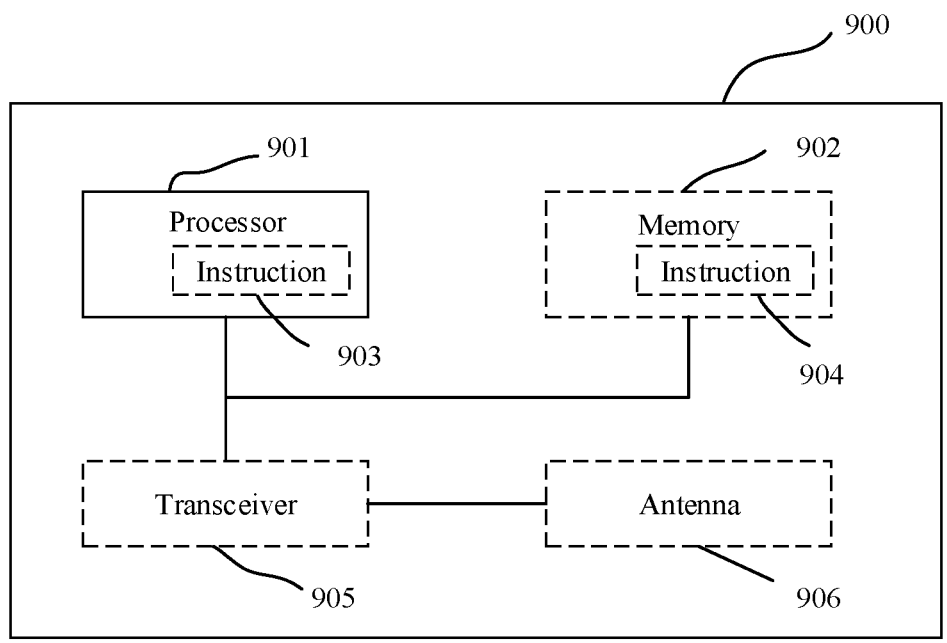
FIG. 9 is a schematic structural diagram of a communications apparatus according to this application.

FIG. 9 is a schematic structural diagram of a communications apparatus. The communications apparatus 900 may be a network device, or may be a terminal device. The communications apparatus may be configured to implement a method that corresponds to the terminal device or the network device and that is described in the foregoing method embodiments. For details, refer to the descriptions in the foregoing method embodiments.

The communications apparatus 900 may include one or more processors 901. The processor 901 may also be referred to as a processing unit, and may implement a control function. The processor 901 may be a general-purpose processor, a dedicated processor, or the like. For example, the processor 901 may be a baseband processor or a central processing unit. The baseband processor may be configured to process a communications protocol and communications data. The central processing unit may be configured to: control the communications apparatus (for example, a base station, a baseband chip, a DU, or a CU), execute a software program, and process data of the software program.

In an optional design, the processor 901 may also store instructions and/or data 903. The instructions and/or data 903 may be run by the processor, so that the communications apparatus 900 performs the method that corresponds to the terminal device or the network device and that is described in the foregoing method embodiments.

In another optional design, the processor 901 may include a transceiver unit configured to implement receiving and sending functions. For example, the transceiver unit may be a transceiver circuit or an interface. A circuit or an interface configured to implement the receiving function and a circuit or an interface configured to implement the sending function may be separated or may be integrated together.

In still another possible design, the communications apparatus 900 may include a circuit. The circuit may implement a sending, receiving, or communication function in the foregoing method embodiments.

Optionally, the communications apparatus 900 may include one or more memories 902. The memory 902 may store instructions 904, and the instructions may be run on the processor, so that the communications apparatus 900 performs the methods described in the foregoing method embodiments. Optionally, the memory may further store data. Optionally, the processor may further store instructions and/or data. The processor and the memory may be separately disposed, or may be integrated together. For example, various correspondences described in the foregoing method embodiments may be stored in the memory, or may be stored in the processor.

Optionally, the communications apparatus 900 may further include a transceiver 905 and/or an antenna 906. The processor 901 may be referred to as a processing unit, and controls the communications apparatus (the terminal device or the network device). The transceiver 905 may be referred to as a transceiver unit, a transceiver machine, a transceiver circuit, a transceiver, or the like, and is configured to implement receiving and sending functions of the communications apparatus.

In a possible design, the communications apparatus 900 (for example, an integrated circuit, a wireless device, a circuit module, a network device, or a terminal) may include the processor 901 and the transceiver 905.

In an implementation, the processor 901 and the transceiver 905 may correspond to the terminal device in the method 200 according to the embodiments of this application, and the communications apparatus 900 may include units configured to perform a method performed by the terminal device in the method 200 in FIG. 2. In addition, the units in the communications apparatus 900 and the foregoing other operations and/or functions are separately used to implement corresponding procedures of the method 200 in FIG. 2.

In another implementation, the processor 901 and the transceiver 905 may correspond to the network device in the method 200 according to the embodiments of this application, and the communications apparatus 900 may include units configured to perform a method performed by the network device in the method 200 in FIG. 2. In addition, the units in the communications apparatus 900 and the foregoing other operations and/or functions are separately used to implement corresponding procedures of the method 200 in FIG. 2.

Specifically, the processor 901 is configured to determine a candidate opportunity set, where a quantity of candidate opportunities included in the candidate opportunity set is a maximum quantity of non-overlapping data transmission opportunities included in a data transmission opportunity set.

The data transmission opportunity set corresponds to a first set, the first set includes one or more downlink sub-time units, and the one or more downlink sub-time units correspond to a target uplink sub-time unit.

The transceiver 905 is configured to send or receive feedback information in the target uplink sub-time unit, where the feedback information includes a hybrid automatic repeat request acknowledgement HARQ-ACK codebook corresponding to the candidate opportunity set.

The communications apparatus provided in this application may determine the candidate opportunity set based on the first set corresponding to an uplink sub-time unit (that is, the target uplink sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the uplink sub-time unit is a sub-slot, the method in this application can reduce a feedback latency.

In an implementation, the processor 901 and the transceiver 905 may correspond to the terminal device in the method 500 according to the embodiments of this application, and the communications apparatus 900 may include units configured to perform a method performed by the terminal device in the method 500 in FIG. 5. In addition, the units in the communications apparatus 900 and the foregoing other operations and/or functions are separately used to implement corresponding procedures of the method 500 in FIG. 5.

In another implementation, the processor 901 and the transceiver 905 may correspond to the network device in the method 500 according to the embodiments of this application, and the communications apparatus 900 may include units configured to perform a method performed by the network device in the method 500 in FIG. 5. In addition, the units in the communications apparatus 900 and the foregoing other operations and/or functions are separately used to implement corresponding procedures of the method 500 in FIG. 5.

Specifically, the processor 901 is configured to determine a candidate opportunity set based on L downlink sub-time units included in a first set, where $L \geq 1$.

The L downlink sub-time units correspond to a target uplink sub-time unit, a data transmission opportunity subset corresponding to one of the L downlink sub-time units includes at least one data transmission opportunity, and an end location of the at least one data transmission opportunity is in the downlink sub-time unit.

The transceiver 905 is configured to send or receive feedback information in the target uplink sub-time unit, where the feedback information includes a hybrid automatic repeat request acknowledgement HARQ-ACK codebook corresponding to the candidate opportunity set.

The communications apparatus provided in this application may determine the candidate opportunity set based on the first set corresponding to an uplink sub-time unit (that is, the target uplink sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the uplink sub-time unit is a sub-slot, the method in this application can reduce a feedback latency. In addition, because none of data transmission opportunity subsets corresponding to the downlink sub-time units in the first set is empty, redundancy of a determined candidate opportunity can be avoided, so that feedback redundancy can be avoided.

In an implementation, the processor 901 and the transceiver 905 may correspond to the terminal device in the method 600 according to the embodiments of this application, and the communications apparatus 900 may include units configured to perform a method performed by the terminal device in the method 600 in FIG. 6. In addition, the units in the communications apparatus 900 and the foregoing other operations and/or functions are separately used to implement corresponding procedures of the method 600 in FIG. 6.

In another implementation, the processor 901 and the transceiver 905 may correspond to the network device in the method 600 according to the embodiments of this application, and the communications apparatus 900 may include units configured to perform a method performed by the network device in the method 600 in FIG. 6. In addition, the units in the communications apparatus 900 and the foregoing other operations and/or functions are separately used to implement corresponding procedures of the method 600 in FIG. 6.

Specifically, the processor 901 is configured to determine a candidate opportunity set, where a quantity of candidate opportunities included in the candidate opportunity set is a maximum quantity of non-overlapping data transmission opportunities included in a data transmission opportunity set.

The data transmission opportunity set corresponds to a first set, the first set includes one or more sub-time units, and the one or more sub-time units correspond to a target sub-time unit.

The transceiver 905 is configured to send or receive feedback information in the target sub-time unit, where the feedback information includes a hybrid automatic repeat request acknowledgement HARQ-ACK codebook corresponding to the candidate opportunity set.

The communications apparatus provided in this application may determine the candidate opportunity set based on the first set corresponding to a sub-time unit (that is, the target sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the sub-time unit is a sub-slot, the method in this application can reduce a feedback latency.

In an implementation, the processor 901 and the transceiver 905 may correspond to the terminal device in the method 800 according to the embodiments of this application, and the communications apparatus 900 may include units configured to perform a method performed by the terminal device in the method 800 in FIG. 8. In addition, the units in the communications apparatus 900 and the foregoing other operations and/or functions are separately used to implement corresponding procedures of the method 800 in FIG. 8.

In another implementation, the processor 901 and the transceiver 905 may correspond to the network device in the method 800 according to the embodiments of this application, and the communications apparatus 900 may include units configured to perform a method performed by the network device in the method 800 in FIG. 8. In addition, the units in the communications apparatus 900 and the foregoing other operations and/or functions are separately used to implement corresponding procedures of the method 800 in FIG. 8.

Specifically, the processor 901 is configured to determine a candidate opportunity set based on L sub-time units included in a first set, where L is a positive integer.

The L sub-time units correspond to a target sub-time unit, a data transmission opportunity subset corresponding to one of the L sub-time units includes at least one data transmission opportunity, an end location of the at least one data transmission opportunity is in the sub-time unit, and the at least one data transmission opportunity does not include an uplink symbol.

The transceiver 905 is configured to send or receive feedback information in the target sub-time unit, where the feedback information includes a hybrid automatic repeat request acknowledgement HARQ-ACK codebook corresponding to the candidate opportunity set.

The communications apparatus provided in this application may determine the candidate opportunity set based on the first set corresponding to a sub-time unit (that is, the target sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the sub-time unit is a sub-slot, the method in this application can reduce a feedback latency. In addition, because none of data transmission opportunity subsets corresponding to the sub-time units in the first set is empty, redundancy of a determined candidate opportunity can be avoided, so that feedback redundancy can be avoided.

The processor and the transceiver described in this application may be implemented on an integrated circuit (integrated circuit, IC), an analog IC, a radio frequency integrated circuit RFIC, a hybrid signal IC, an application-specific integrated circuit (application-specific integrated circuit, ASIC), a printed circuit board (printed circuit board, PCB), an electronic device, or the like. The processor and the transceiver may alternatively be manufactured by using various IC process technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

In the descriptions of the foregoing embodiments, the communications apparatus is described by using the network device or the terminal device as an example. However, a scope of the communications apparatus described in this application is not limited thereto, and a structure of the communications apparatus may not be limited by FIG. 9. The communications apparatus may be an independent device or may be a part of a relatively large device. For example, the device may be:

(1) an independent integrated circuit (IC), a chip, or a chip system or subsystem;
(2) a set including one or more ICs, where optionally, the IC set may further include a storage component configured to store data and/or instructions;
(3) an ASIC, such as a modem;
(4) a module that can be embedded in another device;
(5) a receiver, a terminal, an intelligent terminal, a cellular phone, a wireless device, a handheld phone, a mobile unit, a vehicle-mounted device, a network device, a cloud device, an artificial intelligence device, or the like; or
(6) another device or the like.

Figure 10:
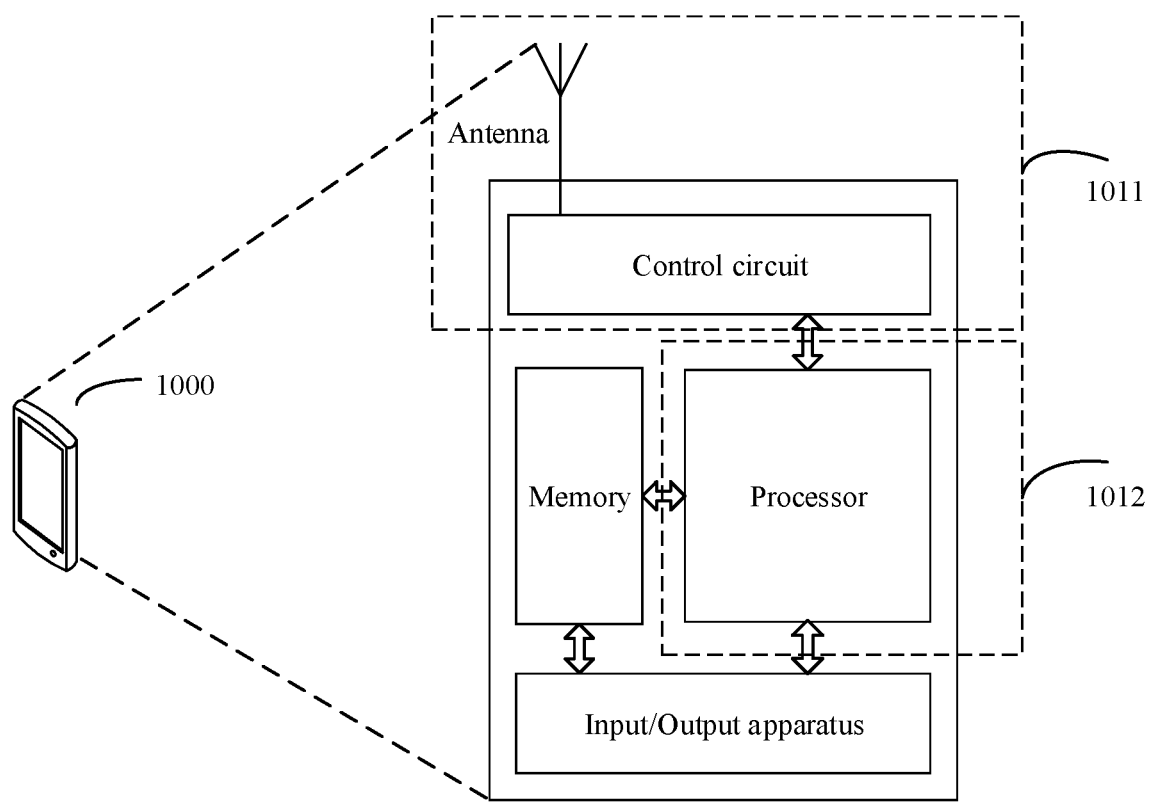
FIG. 10 is a schematic structural diagram of a terminal device according to this application.

FIG. 10 is a schematic structural diagram of a terminal device. The terminal is applicable to the system shown in FIG. 1. For ease of description, FIG. 10 shows only main components of the terminal device. As shown in FIG. 10, the terminal 1000 includes a processor, a memory, a control circuit, an antenna, and an input/output apparatus. The processor is mainly configured to: process a communications protocol and communications data, control the entire terminal device, execute a software program, and process data of the software program. The memory is mainly configured to store the software program and data. The radio frequency circuit is mainly configured to: perform conversion between a baseband signal and a radio frequency signal, and process the radio frequency signal. The antenna is mainly configured to send/receive a radio frequency signal in a form of an electromagnetic wave. The input/output apparatus, such as a touchscreen, a display, or a keyboard, is mainly configured to receive data entered by a user and output data to the user.

After user equipment is powered on, the processor may read a software program stored in a storage unit, parse and execute an instruction of the software program, and process data of the software program. When data needs to be sent wirelessly, after performing baseband processing on the to-be-sent data, the processor outputs a baseband signal to the radio frequency circuit. After processing the baseband signal, the radio frequency circuit obtains a radio frequency signal and sends the radio frequency signal to the outside through the antenna in a form of an electromagnetic wave. When data is sent to the user equipment, the radio frequency circuit receives a radio frequency signal through the antenna, further converts the radio frequency signal into a baseband signal, and outputs the baseband signal to the processor, and the processor converts the baseband signal into data and processes the data.

A person skilled in the art may understand that for ease of description, FIG. 10 shows only one memory and one processor. An actual terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communications protocol and the communications data, and the central processing unit is mainly configured to: control the entire terminal, execute the software program, and process the data of the software program. The processor in FIG. 10 integrates functions of the baseband processor and the central processing unit. A person skilled in the art may understand that the baseband processor and the central processing unit may be independent processors, and are interconnected by using technologies such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a form of a software program. The processor executes the software program to implement a baseband processing function.

In an example, the antenna and the control circuit that have receiving and sending functions may be considered as a transceiver unit 1011 of the terminal 1000, and the processor having a processing function may be considered as a processing unit 1012 of the terminal 1000. As shown in FIG. 10, the terminal device 1000 includes the transceiver unit 1011 and the processing unit 1012. The transceiver unit may also be referred to as a transceiver, a transceiver machine, a transceiver apparatus, or the like. Optionally, a component that is in the transceiver unit 1011 and that is configured to implement a receiving function may be considered as a receiving unit, and a component that is in the transceiver unit 1011 and that is configured to implement a sending function may be considered as a sending unit. In other words, the transceiver unit 1011 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like. Optionally, the receiving unit and the sending unit may be integrated into one unit, or may be a plurality of units independent of each other. The receiving unit and the sending unit may be at one geographical location, or may be scattered at a plurality of geographical locations.

Figure 11:
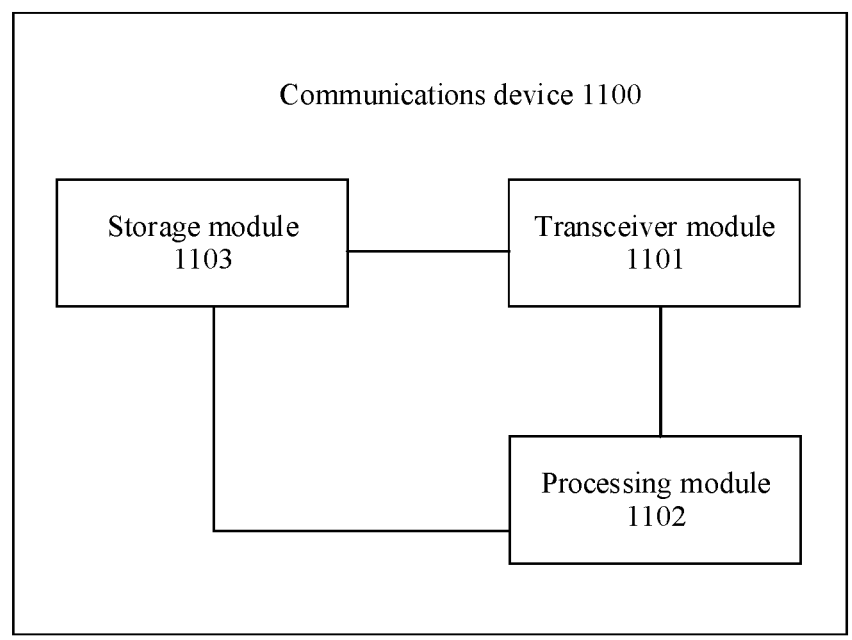
FIG. 11 is a schematic structural diagram of another communications apparatus (or referred to as a communications device) according to this application.

As shown in FIG. 11, another embodiment of this application provides a communications apparatus (a communications device) 1100. The communications apparatus may be a terminal device, or may be a component (for example, an integrated circuit or a chip) of a terminal. Alternatively, the communications apparatus may be a network device, or may be a component (for example, an integrated circuit or a chip) of a network device. Alternatively, the communications apparatus may be another communications module, configured to implement an operation corresponding to a communications device or node in the method embodiments of this application. The communications apparatus 1100 may include a processing module 1102 (a processing unit). Optionally, the communications apparatus 1100 may further include a transceiver module 1101 (a transceiver unit) and a storage module 1103 (a storage unit).

In a possible design, one or more modules in FIG. 11 may be implemented by one or more processors, may be implemented by one or more processors and memories, may be implemented by one or more processors and transceivers, or may be implemented by one or more processors, memories, and transceivers. This is not limited in this embodiment of this application. The processor, the memory, and the transceiver may be separately disposed, or may be integrated together.

The communications apparatus has a function of implementing the terminal device described in the embodiments of this application. For example, the communications apparatus includes corresponding modules, units, or means (means) used by the terminal to perform terminal-related steps described in the embodiments of this application, and the functions, units, or means (means) may be implemented by software, may be implemented by hardware, or may be implemented by hardware executing corresponding software. For details, refer to corresponding descriptions in the foregoing corresponding method embodiments.

Alternatively, the communications apparatus has a function of implementing the network device described in the embodiments of this application. For example, the communications apparatus includes corresponding modules, units, or means (means) used by the network device to perform network device-related steps described in the embodiments of this application, and the functions, units, or means (means) may be implemented by software, may be implemented by hardware, or may be implemented by hardware executing corresponding software. For details, refer to corresponding descriptions in the foregoing corresponding method embodiments.

Optionally, the modules in the communications apparatus 1100 in this embodiment of this application may be configured to perform the method described in FIG. 2, FIG. 5, FIG. 6, or FIG. 8 in the embodiments of this application.

In an implementation, the processing module 1102 is configured to determine a candidate opportunity set, where a quantity of candidate opportunities included in the candidate opportunity set is a maximum quantity of non-overlapping data transmission opportunities included in a data transmission opportunity set.

The data transmission opportunity set corresponds to a first set, the first set includes one or more downlink sub-time units, and the one or more downlink sub-time units correspond to a target uplink sub-time unit.

The transceiver module 1101 is configured to send or receive feedback information in the target uplink sub-time unit, where the feedback information includes a hybrid automatic repeat request acknowledgement HARQ-ACK codebook corresponding to the candidate opportunity set.

The communications apparatus provided in this application may determine the candidate opportunity set based on the first set corresponding to an uplink sub-time unit (that is, the target uplink sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the uplink sub-time unit is a sub-slot, the method in this application can reduce a feedback latency.

In another implementation, the processing module 1102 is configured to determine a candidate opportunity set based on L downlink sub-time units included in a first set, where L≥1.

The L downlink sub-time units correspond to a target uplink sub-time unit, a data transmission opportunity subset corresponding to one of the L downlink sub-time units includes at least one data transmission opportunity, and an end location of the at least one data transmission opportunity is in the downlink sub-time unit.

The transceiver module 1101 is configured to send or receive feedback information in the target uplink sub-time unit, where the feedback information includes a hybrid automatic repeat request acknowledgement HARQ-ACK codebook corresponding to the candidate opportunity set.

The communications apparatus provided in this application may determine the candidate opportunity set based on the first set corresponding to an uplink sub-time unit (that is, the target uplink sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the uplink sub-time unit is a sub-slot, the method in this application can reduce a feedback latency. In addition, because none of data transmission opportunity subsets corresponding to the downlink sub-time units in the first set is empty, redundancy of a determined candidate opportunity can be avoided, so that feedback redundancy can be avoided.

In another implementation, the processing module 1102 is configured to determine a candidate opportunity set, where a quantity of candidate opportunities included in the candidate opportunity set is a maximum quantity of non-overlapping data transmission opportunities included in a data transmission opportunity set.

The data transmission opportunity set corresponds to a first set, the first set includes one or more sub-time units, and the one or more sub-time units correspond to a target sub-time unit.

The transceiver module 1101 is configured to send or receive feedback information in the target sub-time unit, where the feedback information includes a hybrid automatic repeat request acknowledgement HARQ-ACK codebook corresponding to the candidate opportunity set.

The communications apparatus provided in this application may determine the candidate opportunity set based on the first set corresponding to a sub-time unit (that is, the target sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the sub-time unit is a sub-slot, the method in this application can reduce a feedback latency.

In another implementation, the processing module 1102 is configured to determine a candidate opportunity set based on L sub-time units included in a first set, where L is a positive integer.

The L sub-time units correspond to a target sub-time unit, a data transmission opportunity subset corresponding to one of the L sub-time units includes at least one data transmission opportunity, an end location of the at least one data transmission opportunity is in the sub-time unit, and the at least one data transmission opportunity does not include an uplink symbol.

The transceiver module 1101 is configured to send or receive feedback information in the target sub-time unit, where the feedback information includes a hybrid automatic repeat request acknowledgement HARQ-ACK codebook corresponding to the candidate opportunity set.

The communications apparatus provided in this application may determine the candidate opportunity set based on the first set corresponding to a sub-time unit (that is, the target sub-time unit) used for HARQ-ACK codebook feedback. After the candidate opportunity set is determined, the terminal device may perform HARQ-ACK codebook feedback based on a status of receiving downlink data transmission on a candidate opportunity in the candidate opportunity set. Correspondingly, the network device may receive, based on the candidate opportunity set, the HARQ-ACK codebook fed back by the terminal device. The method in this application may be applied to semi-static codebook feedback, and when the sub-time unit is a sub-slot, the method in this application can reduce a feedback latency. In addition, because none of data transmission opportunity subsets corresponding to the sub-time units in the first set is empty, redundancy of a determined candidate opportunity can be avoided, so that feedback redundancy can be avoided.

According to the method provided in the embodiments of this application, this application further provides a computer program product. The computer program product includes computer program code. When the computer program code is run on a computer, the computer is enabled to perform the method in the embodiment shown in FIG. 2 or FIG. 5.

According to the method provided in the embodiments of this application, this application further provides a computer-readable medium. The computer-readable medium stores program code. When the program code is run on a computer, the computer is enabled to perform the method in the embodiment shown in FIG. 2 or FIG. 5.

According to the method provided in the embodiments of this application, this application further provides a system. The system includes the foregoing one or more terminal devices and the foregoing one or more network devices.

All or some of the foregoing embodiments may be implemented by using software, hardware, firmware, or any other combination. When software is used to implement the embodiments, all or some of the foregoing embodiments may be implemented in a form of a computer program product. The computer program product includes one or more computer instructions. When the computer program instructions are loaded or executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), or a semiconductor medium. The semiconductor medium may be a solid-state drive.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

It may be understood that various numbers and letters such as first, second, #0, #1, and #A in this application are merely distinguished for ease of description, but are not intended to limit the scope of the embodiments of this application.

"Predefine" in this application may be understood as "define", "predefine", "define by a protocol", "store", "pre-store", "pre-negotiate", "preconfigure", "solidify", or "pre-burn".

It may be understood that the term "and/or" in this application describes an association relationship between associated objects and represents that three relationships may exist. For example, A and/or B may represent the following three cases: Only A exists, both A and B exist, and only B exists. The character "/" usually indicates an "or" relationship between the associated objects. The term "at least one" means one or more. The term "at least one of A and B", similar to the term "A and/or B", describes an association relationship between associated objects and represents that three relationships may exist. For example, "at least one of A and B" may represent the following three cases: Only A exists, both A and B exist, and only B exists.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
    determining a candidate opportunity set, wherein a quantity of candidate opportunities comprised in the candidate opportunity set is a maximum quantity of non-overlapping groups of data transmission opportunities comprised in a data transmission opportunity set, wherein:
    the data transmission opportunity set corresponds to a first set,
    the first set comprises one or more downlink sub-time units, and
    the one or more downlink sub-time units correspond to a target uplink sub-time unit; and
    performing one of sending or receiving feedback information in the target uplink sub-time unit,
    wherein the feedback information comprises a hybrid automatic repeat request acknowledgement (HARQ-ACK) codebook corresponding to the candidate opportunity set,
    wherein the data transmission opportunity set is a union set of data transmission opportunities corresponding to K downlink time units in a second set,
    wherein the second set comprises a downlink time unit corresponding to all downlink sub-time units in the first set, a quantity of downlink time units corresponding to all the downlink sub-time units in the first set is K, and K is a positive integer;
    wherein an end location of a data transmission opportunity corresponding to a downlink time unit in the second set is in a downlink sub-time unit that is in the first set and that corresponds to the downlink time unit; and
    wherein the one or more downlink sub-time units included in the first set is determined based on one or more offsets, wherein a time domain offset of the target uplink sub-time unit relative to each of the one or more downlink sub-time units is one of the one or more offsets, and wherein the one or more downlink sub-time units respectively correspond to the one or more offsets.

2. The method according to claim 1, wherein the candidate opportunity set is a union set of candidate opportunities corresponding to the K downlink time units in the second set, and
    a quantity of candidate opportunities corresponding to one downlink time unit in the second set is a maximum quantity of non-overlapping groups of data transmission opportunities comprised in a data transmission opportunity subset corresponding to the downlink time unit.

3. The method according to claim 1, wherein a length of the downlink time unit is equal to a length of one downlink slot.

4. The method according to claim 1, wherein: the downlink time unit comprises two downlink sub-time units; and two uplink sub-time units are comprised in one uplink time unit.

5. The method according to claim 1, wherein: a length of the downlink sub-time unit is less than the length of one downlink slot, and a length of the uplink sub-time unit is less than a length of one uplink slot.

6. The method according to claim 1, wherein a length of the uplink sub-time unit is a same length as a length of the downlink sub-time unit.

7. The method of claim 1, wherein one candidate opportunity, of the candidate opportunity set, corresponds to one or more data transmission opportunities that correspond to a single ACK/NACK feedback.

8. An apparatus, comprising:
    one or more processors;
    one or more memories coupled to the one or more processors, wherein the one or more memories store a program to be executed by the one or more processors, the program including instructions that, when executed by the one or more processors, facilitate the apparatus carrying out a method comprising:

determining a candidate opportunity set, wherein a quantity of candidate opportunities comprised in the candidate opportunity set is a maximum quantity of non-overlapping groups of data transmission opportunities comprised in a data transmission opportunity set, wherein:

the data transmission opportunity set corresponds to a first set, the first set comprises one or more downlink sub-time units, and the one or more downlink sub-time units correspond to a target uplink sub-time unit; and performing one of sending or receiving feedback information in the target uplink sub-time unit, wherein the feedback information comprises a hybrid automatic repeat request acknowledgement (HARQ-ACK) codebook corresponding to the candidate opportunity set, wherein the data transmission opportunity set is a union set of data transmission opportunities corresponding to K downlink time units in a second set, wherein the second set comprises a downlink time unit corresponding to all downlink sub-time units in the first set, a quantity of downlink time units corresponding to all the downlink sub-time units in the first set is K, and K is a positive integer;

wherein an end location of a data transmission opportunity corresponding to a downlink time unit in the second set is in a downlink sub-time unit that is in the first set and that corresponds to the downlink time unit; and wherein the one or more downlink sub-time units included in the first set is determined based on one or more offsets, wherein a time domain offset of the target uplink sub-time unit relative to each of the one or more downlink sub-time units is one of the one or more offsets, and wherein the one or more downlink sub-time units respectively correspond to the one or more offsets.

9. The apparatus according to claim 8, wherein the candidate opportunity set is a union set of candidate opportunities corresponding to the K downlink time units in the second set, and a quantity of candidate opportunities corresponding to one downlink time unit in the second set is a maximum quantity of non-overlapping groups of data transmission opportunities comprised in a data transmission opportunity subset corresponding to the downlink time unit.

10. The apparatus according to claim 8, wherein a length of the downlink time unit is equal to a length of one downlink slot.

11. The apparatus according to claim 8, wherein the downlink time unit comprises two downlink sub-time units; and two uplink sub-time units are comprised in one uplink time unit.

12. The apparatus according to claim 8, wherein a length of the downlink sub-time unit is less than the length of one downlink slot, and a length of the uplink sub-time unit is less than a length of one uplink slot.

13. The apparatus according to claim 8, wherein a length of the uplink sub-time unit is a same length as a length of the downlink sub-time unit.

14. The apparatus of claim 8, wherein one candidate opportunity, of the candidate opportunity set, corresponds to one or more data transmission opportunities that correspond to a single ACK/NACK feedback.

15. A non-transitory computer readable medium, wherein the non-transitory computer readable medium stores instructions that, when executed by one or more processors, facilitate carrying out a method comprising determining a candidate opportunity set, wherein a quantity of candidate opportunities comprised in the candidate opportunity set is a maximum quantity of non-overlapping groups of data transmission opportunities comprised in a data transmission opportunity set, wherein:

the data transmission opportunity set corresponds to a first set, the first set comprises one or more downlink sub-time units, and the one or more downlink sub-time units correspond to a target uplink sub-time unit; and performing one of sending or receiving feedback information in the target uplink sub-time unit, wherein the feedback information comprises a hybrid automatic repeat request acknowledgement (HARQ-ACK) codebook corresponding to the candidate opportunity set, wherein the data transmission opportunity set is a union set of data transmission opportunities corresponding to K downlink time units in a second set, wherein the second set comprises a downlink time unit corresponding to all downlink sub-time units in the first set, a quantity of downlink time units corresponding to all the downlink sub-time units in the first set is K, and K is a positive integer;

wherein an end location of a data transmission opportunity corresponding to a downlink time unit in the second set is in a downlink sub-time unit that is in the first set and that corresponds to the downlink time unit; and wherein the one or more downlink sub-time units included in the first set is determined based on one or more offsets, wherein a time domain offset of the target uplink sub-time unit relative to each of the one or more downlink sub-time units is one of the one or more offsets, and wherein the one or more downlink sub-time units respectively correspond to the one or more offsets.

16. The non-transitory computer readable medium according to claim 15, wherein the candidate opportunity set is a union set of candidate opportunities corresponding to the K downlink time units in the second set, and a quantity of candidate opportunities corresponding to one downlink time unit in the second set is a maximum quantity of non-overlapping groups of data transmission opportunities comprised in a data transmission opportunity subset corresponding to the downlink time unit.

17. The non-transitory computer readable medium according to claim 15, wherein a length of the downlink time unit is equal to a length of one downlink slot.

18. The non-transitory computer readable medium according to claim 15, wherein: a length of the downlink sub-time unit is less than the length of one downlink slot, and a length of the uplink sub-time unit is less than a length of one uplink slot.

19. The non-transitory computer-readable medium according to claim 15, wherein a length of the uplink sub-time unit is a same length as a length of the downlink sub-time unit.

20. The non-transitory computer-readable medium of claim 15, wherein one candidate opportunity, of the candidate opportunity set, corresponds to one or more data transmission opportunities that correspond to a single ACK/NACK feedback.

* * * * *

UNITED STATES PATENT AND TRADEMARK OFFICE
CERTIFICATE OF CORRECTION

PATENT NO. : 12,004,130 B2
APPLICATION NO. : 17/372197
DATED : June 4, 2024
INVENTOR(S) : Li et al.

Page 1 of 1

It is certified that error appears in the above-identified patent and that said Letters Patent is hereby corrected as shown below:

In the Claims

Claim 8: Column 42, Line 66: "one or memories coupled to the one or more processors," should read -- one or more memories coupled to the one or more processors, --.

Claim 11: Column 43, Line 57: "The apparatus according to claim 8, wherein the" should read -- The apparatus according to claim 8, wherein: the --.

Claim 12: Column 43, Line 61: "The apparatus according to claim 8, wherein a length" should read -- The apparatus according to claim 8, wherein: a length --.

Claim 16: Column 44, Line 50: "according to claim 15, wherein the candidate opportunity set" should read -- according to claim 15, wherein: the candidate opportunity set --.

Signed and Sealed this
Fifteenth Day of April, 2025

Coke Morgan Stewart
*Acting Director of the United States Patent and Trademark Office*